US011157926B2

(12) United States Patent
Guan et al.

(10) Patent No.: US 11,157,926 B2
(45) Date of Patent: Oct. 26, 2021

(54) DIGITAL CONTENT PRIORITIZATION TO ACCELERATE HYPER-TARGETING

(71) Applicant: ACCENTURE GLOBAL SOLUTIONS LIMITED, Dublin (IE)

(72) Inventors: Lan Guan, Johns Creek, GA (US); Sundaravadivelan Ramamoorthy, Chennai (IN); Louise Noreen Barrere, Torrance, CA (US); Christopher Yen-Chu Chan, Jersey City, NJ (US); Ivan Wong, Edison, NJ (US); Aiperi Iusupova, Chicago, IL (US); Saurabh Mathur, Jodhpur (IN); Nivedita Samal, Bangalore (IN); Soumya Singh, Gorakhpur (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 89 days.

(21) Appl. No.: 16/534,357

(22) Filed: Aug. 7, 2019

(65) Prior Publication Data

US 2021/0042767 A1 Feb. 11, 2021

(51) Int. Cl.
*G06Q 30/02* (2012.01)

(52) U.S. Cl.
CPC ..... *G06Q 30/0201* (2013.01); *G06Q 30/0202* (2013.01); *G06Q 30/0254* (2013.01); *G06Q 30/0255* (2013.01); *G06Q 30/0263* (2013.01)

(58) Field of Classification Search
CPC .......... G06Q 30/0201; G06Q 30/0254; G06Q 30/0263; G06Q 30/0255; G06Q 30/0202

USPC ....................................................... 705/7.29
See application file for complete search history.

(56) References Cited

FOREIGN PATENT DOCUMENTS

JP    2002111809 A  *  4/2002

OTHER PUBLICATIONS

Joshua Miller, Hypertargeting Can Take Your Digital Campaigns to the Next Level, 2017 (Year: 2017).*

* cited by examiner

*Primary Examiner* — Tarek Elchanti
(74) *Attorney, Agent, or Firm* — Mannava & Kang, P.C.

(57) ABSTRACT

A digital content communication system for account management and predictive analytics may be provided. The system may include an analytics system that communicates with one or more servers and one or more data stores to provide digital content management in a network. The analytics system may include a data access interface to receive data associated with a customer, as well as a processor to: standardize the received data using a standardization technique; process the standardized data using a dark data processing technique; generate a customer fit score and a digital density score based on the dark data processing of the standardized data; match received data associated with a customer against at least one variable using at least one matching technique; create a lead analytical record (LAR); prioritize leads in the LAR using a predictive modeling technique; and establish optimized channel assignment based on at least one of the customer fit score, the digital intensity score, the LAR, or the matching and prioritization actions.

18 Claims, 17 Drawing Sheets

1100A

W1.AdTech Score + W2.eComm Stack Score + W3.Payment Type Score + W4.Pixel Score = Digital Intensity Score

| Website | Ad_tech_score | Ecomm_stack_score | Ecomm_payment_score | Pixel_score | Digital_intensity_score | Digital_intensity_assign |
|---|---|---|---|---|---|---|
| http://www.website1.com | 0 | 5 | 4 | 12 | 10.83204 | H |
| http://www.website2.us | 3 | 5 | 4 | 7.4 | 10.679358 | H |
| http://www.website3.com | 0 | 5 | 5 | 9 | 10.41503 | H |
| http://www.mywebsite1.com | 0 | 5 | 3 | 12 | 9.99904 | H |
| http://www.superwebsite.com | 0 | 5 | 5 | 7.4 | 9.748358 | H |
| http://www.website4.com | 0 | 5 | 2 | 12 | 9.16604 | H |
| http://www.mywebsite2.com | 0 | 5 | 4 | 7.4 | 8.915358 | H |

Weights

| Score | Weight |
|---|---|
| Ad Tech Score | .588 |
| eComm Stack Score | .5 |
| Payment Type Score | .833 |
| Pixel Score | .41667 |

| Website | w1*Category Score | w2*Price Point Score | W3*Badge Millennial Score | W4*Influencer Score | W5*Brick and Mortar Score |
|---|---|---|---|---|---|
| | Category_score | Price_point_s core | Badge_millennium_score | Pixel_sc | Yelp_sc | Insta_engagement | Twitter_engagement | Influencer_fit_score | Customer_fit_score | Customer_fit_as sign |
| http://www.website1.com | 0 | 4.2 | 0 | 0 | 0 | 0 | 0 | 4.2 | L |
| http://www.website2.us | 3.9 | 4.4 | 0 | 0 | 0 | 0 | 0 | 8.3 | H |
| http://www.website3.com | 0 | 5 | 5 | 0 | 0 | 0 | 3 | 11.65 | H |
| http://www.mywebsite1.com | 0 | 0 | 5 | 0 | 0 | 0 | 0 | 5 | M |
| http://www.superwebsite.com | 2.8 | 2.7 | 0 | 0 | 0 | 0 | 0 | 5.5 | M |
| http://www.website4.com | 0 | 0 | 5 | 0 | 0 | 2 | 2 | 6.1 | M |
| http://www.mywebsite2.com | 3.9 | 4.4 | 5 | 0 | 0 | 2 | 2 | 14.4 | H |

Weights

| Customer Fit Score | |
|---|---|
| Category Score | 1 |
| Price Point Score | 1 |
| Badge Millennial Score | 1 |
| Influencer Score | .55 |
| Brick-and-Mortar Score | -1 |

DIGITAL CONTENT PRIORITIZATION TO ACCELERATE HYPER-TARGETING

TECHNICAL FIELD

This patent application relates generally to digital content management, and more specifically, to systems and methods for digital content prioritization to accelerate hyper-targeting using optimized channel assignment using predictive analytics forecasting.

BACKGROUND

Advances in telecommunications are changing the way people communicate with each other and the way people sell and buy things. The commercial industry, for example, has witnessed unprecedented digital growth and change in recent years. Together with increased globalization and use of social media, large volumes of data are being exchanged at a rapid rate. All this has altered the landscape when it comes to management of data, particularly data associated with commercial leads.

To increase customer engagement and maximize commercial leads, traditional solutions to target customers are typically based on collecting bits and pieces of information about customers, such as their interests, which may be ascertained from questionnaires or browsing histories. However, these conventional approaches fail to address technical problems beyond simple customer engagement. For example, current solutions lack the technical ability to more fully gather, process, and make sense of available data, and to leverage such information to improve customer retention, selection, and potential spend, to optimize channel assignment based on customer behavior and pattern recognition, and/or to predict pricing and forecasting for various products or services.

As a result, a more robust and holistic approach for digital content management and optimized channel assignment using predictive analytics and forecasting may be imperative to overcome the shortcomings of conventional systems and methods.

BRIEF DESCRIPTION OF DRAWINGS

Features of the present disclosure are illustrated by way of example and not limited in the following Figure(s), in which like numerals indicate like elements:

FIG. 11A-11B illustrate screens for a digital content management system using channel assignment and predictive analytics, according to an example.

DETAILED DESCRIPTION

Figure 1:
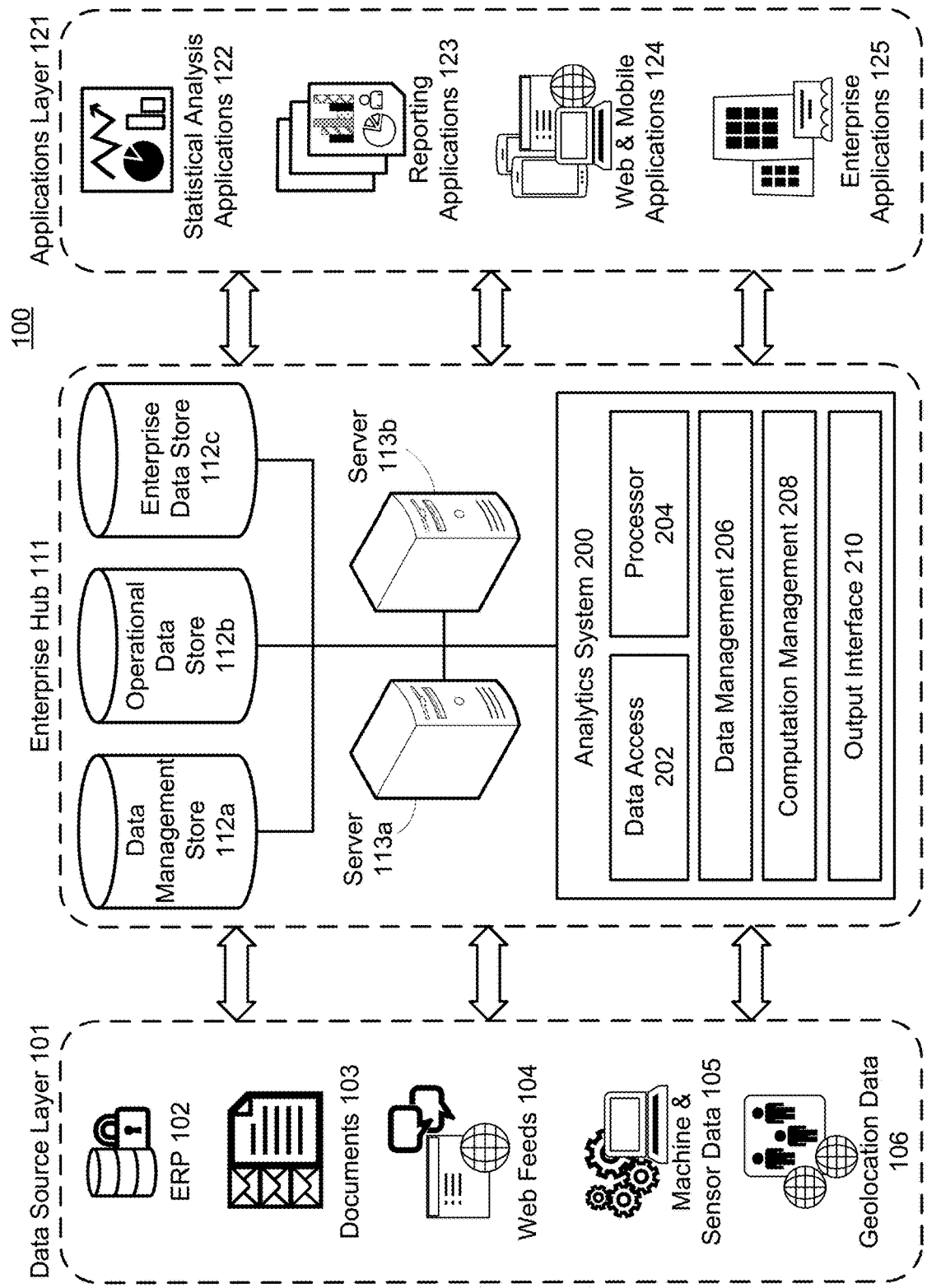
FIG. 1 illustrates a system environment for a digital content management system using optimized channel assignment predictive analytics forecasting, according to an example.

For simplicity and illustrative purposes, the present application is described by referring mainly to examples and embodiments thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

As described above, traditional solutions to target customers and maximize commercial or sales leads may be limited. Generating customer interest by collecting bits and pieces of information related to their browsing habits, for example, may not be enough. These and other traditional solutions fail to provide a comprehensive approach to managing data associated with commercial or sales environment.

In particular, the technical problems associated conventional approaches are three-fold. First, current systems and methods do not adequately collect, process, and/or utilize data (directly or indirectly) from third parties or otherwise, to properly identify, characterize, and target customer spend, engagement, and/or retention. Second, current systems and methods also fail to assign customers to the "best" or "appropriate" channel to reach customers. Third, current systems and methods do not determine pricing or forecasting models best suited for a customer's products, services, or solutions. Rather, conventional systems and methods may simply provide product or customer support that rely heavily on human resources or limited piecemeal approaches, which are often cumbersome, costly, roundabout, and inefficient, or offer pricing solutions that do not more fully consider behavior, trends, or other considerations.

Furthermore, as larger volumes of data and digital transactions are taking place, and all at a higher rate, the commercial landscape has significantly altered especially when it comes to management of data associated with commercial or sales leads. As a result, traditional approaches are ill-equipped to provide data management or sales teams, in any industry or scenario, a more comprehensive or "three-dimensional" view for maximizing commercial or sales leads for small and midsize businesses (SMB).

According to examples described herein, an analytics-based data management platform with a holistic approach to data management, channel optimization, and pricing and forecasting based on predictive analytics may be provided. In an example, the digital content management system not only reduces complexity of conventional systems that may require manual resources or cumbersome, piecemeal coordination of several components, but the digital content management system may help create a lead analytical record (LAR), which when harvested may provide a more comprehensive understanding of any commercial lead. This lead analytical record (LAR) may be used to optimize channel assignment, as well as for predicting and forecasting, or other ways to maximize commercial or sales leads.

A "lead" or "lead record," as described herein, may refer to a person, business, or entity may develop into a potential customer or client. A "lead" or "lead record" may also refer to data associated with a person, business, or entity that may leads to a sale of a product or service. A lead may be generated from referrals of an existing customer or through response of potential customer via advertising, trade shows, direct communications, third parties, or other publicity. Pursing and closing a lead may involve several iterative or subsequent actions to increase customer engagement and interest, all of which might lead to a final sale or business relationship for future or continued economic benefit. At times, the terms "lead" or "lead record" may be used interchangeably with each other and with "lead analytical record (LAR)."

In some examples, the lead or lead record may be data or information of a customer profile (e.g., name, address, company, accounts, etc.). However, with larger volumes of data communicated and transmitted over several communications channels, such as social media, the lead or lead record may also include a broader view of that potential customer, such as information on a customer's particular role in her company or anticipated purchasing time frame. Other lead information may include, but not limited to, customer tendencies, (e.g., spend potential, purchasing habits, interests, trends, engagement capability), customer network and potential (e.g., suppliers, customers, competitors, pricing arrangements, marketing, channels, etc.), and/or other related customer data or information. All of this information may help provide contours and give shape to any potential customer and the likelihood of future business. An organizational entity's lead generation efforts and its approach to dealing with leads may significantly affect its success in the marketplace. To that end, most organizational entities may seek to establish effective practices, spanning the lead generation, qualification, and/or distribution processes.

Current challenges with leads may involve data collection, categorization, and/or management. Successful lead generation may vary quite a bit; however, once leads are obtained, it may be challenging to properly use that data in a meaningful way. Therefore, standardization of leads may be an important part of the process. Thus, data collection may further involve gathering, cleaning, and matching data.

Furthermore, leads may come in many varieties and categories, which may also change as time progresses. There may be several lead types or categories. A lead category may include "suspects" or potential customers at a very nascent stage. These may include those that have expressed initial interest in a product or service. Getting the "suspect" moved along the process may be the task of lead nurturing. Another lead category may involve identifying customers as "cold," "warm," or "hot" leads. These categories may be based on a rating system that identifies a prospective customer's level of interest or readiness to purchase a product or service. Other lead categories may include "market-qualified" and "sales-qualified" groupings. A market-qualified lead may refer to a highly-interested potential customer who has shown interest, but for one reason or another, such as a financial reason, may not able to make a purchase or enter into a sales relationship in the near term. A sales-qualified lead, however, may refer to a highly-interested potential customer who has shown interest and is fully capable to make a purchase or enter into a sales relationship in the near term. Creating and assigning leads to these or other categories may be an important feature of the digital content management system for maximizing leads and creating a lead analytical record (LAR).

Management of leads may also present several challenges. For example, the management of leads may include capturing, tracking, and distributing leads to sales teams for closing. Much of the management of leads may involve cultivating individual leads, which may rely on various scoring, matching, forecasting, and predictive analysis. Other actions may also be required to help with understanding and/or nurturing customers through the sales pipeline.

The digital content management system, as described herein, may therefore allow an organization entity (e.g., commercial, financial, government, etc.) to better engage with its customers to provide a deeper level of commercial or sales support. This may be achieved by providing digital content management and optimizing channel assignment using predictive analytics and forecasting. In this way, the digital content management system may provide a more robust, expedient, less error prone, and more "intelligent" approach for customer support. This, in turn, may also help create lead analytical records (LARs), which may be used by SMBs to increase customer engagement, retention, market analysis, pricing, forecasting, and other commercial benefits. Moreover, the digital content management system described herein may further provide techniques for data standardization and improved resource management, not to mention other benefits, such as load-balancing, optimized channel assignment, minimalist design, and/or reduced efficient energy consumption.

FIG. 1 illustrates a system environment for a digital content management system 100 using optimized channel assignment predictive analytics forecasting, according to an example. The digital content management system 100 may provide for the monitoring and analysis of data. In particular, the digital content management system 100 may be used to monitor and analyze data in an enterprise environment for an organizational entity. The organizational entity may be a financial entity, a commercial entity, a government entity, or other entity. The digital content management system 100 may also store information or provide for the transmission and/or reception of information from a variety of internal, external, or other data sources associated with the organizational entity, its members, affiliates, partners, and/or its customers, suppliers, clients, or other parties. For example, the digital content management system 100 may use optimized channel assignment predictive analytics forecasting to help provide digital content management, especially in creating a lead analytical record. The digital content management system 100 may further include a clustering system to provide predictive analytics or other similar features using data.

The digital content management system 100 may operate in a network or an enterprise environment where data is exchanged, and where products or services are being offered to customers. More specifically, the digital content management system 100 may provide real-time or near real-time monitoring and analysis of data exchange and data storage, as well as an artificial intelligence system that uses analytics and predictive modeling to manage leads and the creation of a lead analytical record. The digital content management system 100 may include a data source layer 101, an enterprise hub 111, and an applications layer 121.

The data source layer 101 may include systems, subsystems, applications, and/or interfaces to collect information from enterprise resource planning (ERP) systems and applications 102 (hereinafter "ERR"), documents 103, web feeds 104, machine and sensor data 105 (hereinafter "sensor data"), and geolocation data 106, all of which may be distinct or integrated with the digital content management system 100. The data source layer 101 may include other data or information sources as well, and beyond what is shown. It should be appreciated that each of these data sources may further include its own data feed, storage, system, application, or other source for collecting and sending data and information, including third party or indirect sources.

The ERP system 102 may include one or more application servers that host various ERP applications. These may include, for example, a customer relationship management (CRM) platform, system, or application. The ERP system 102 may collect, store, manage, and interpret data associated with various enterprise functions or activities. The ERP system 102 may provide an integrated and continuously updated view of core business processes using common databases maintained by a database management system. The ERP system 102 may track enterprise resources (e.g., cash, raw materials, production capacity, etc.) as well as other information, such as corporate or business transactions (e.g., orders, purchase orders, payroll, ticketing, etc.). Furthermore, the applications that make up the ERP system 102 may share data across various departments (e.g., manufacturing, purchasing, sales, accounting, etc.) that provide the data. The ERP system 102 may facilitate information flow between many enterprise functions and may manage communications with stakeholders or other outside parties. As a result, the ERP system 102 may contain large quantities of information and data.

The documents 103 may provide another source of data. Data received at the documents 103 may include files, emails, faxes, scans, or other documents that are transmitted, received, and stored in an enterprise or personal use environment.

The web feeds 104 may be yet another source of data. Data received at the web feeds 104 may include data from various web sources, such as websites, social media, syndication, aggregators, or from scraping. Websites may include uniform resource locator (URL) or other website identifier. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing.

The machine and sensor data 105 may be another source of data and information in an enterprise environment. For example, in an enterprise network, there may be physical mobile devices, vehicles, appliances, and other enterprise systems that are equipped with electronics, software, and/or sensors, where most, if not all, of these items are within a network and share some measure of connectivity which enable these and other pieces of equipment to connect, communicate, and exchange data. This may allow various systems, objects, and items in an enterprise environment to be detected, sensed, or remotely controlled over one or more networks, creating a vast array of enterprise functionalities. These may include abilities to provide data analytics on equipment, assessment of equipment health or performance, improved efficiency, increased accuracy or function, economic benefit, reduction of human error, etc. By creating a "smarter" environment and leveraging interactivity between various pieces of equipment in an enterprise network, the machine and sensor data 105 may provide significant amounts of information and data that can be collected. Together with other technologies and systems described herein, the machine and sensor data 105 may help enable the digital content management system 100 provide a more efficient way to create a lead analytical record.

The geolocation data 106 may include information or data associated with identification or estimation of real-world geographic location of an object, such as a radar source, mobile device, or web-based computer or processing device. Geolocation data 106 may provide specific geographic coordinates or data that may be used for monitoring location, distinct or together with, other various positioning systems or applications. For example, the geolocation data 106 may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data 106 may include other self-disclosing or self-identifying information, including but not limited to country, region county, city, postal/zip code, latitude, longitude, time zone, domain name, connection speed, internet service provider (ISP), language, proxies, or other information that can be used to piece together and trace location. This and other data in the data source layer 101 may be collected, monitored, analyzed, and/or incorporated with digital data management.

The enterprise hub 111 may collect, manage, process, and analyze information and data from the data source layer 101 and the applications layer 121. The enterprise hub 111 may be within general control of an enterprise, such as an organizational entity conducting operations, business, or other related activities. The enterprise hub 111 may collect, manage, process, and analyze information and data from the data source layer 101 and the applications layer 121. In order to do this, the enterprise hub 111 may include one or more data stores, one or more servers, and other elements to process data for its organizational purposes. For example, the enterprise hub 111 may include a data management store 112a, an operational data store 112b, and an enterprise data store 112c. The data management store 112a may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource.

The operational data store 112b may store information and data associated with operational reporting, controls, and decision-making. The operational data store 112b may be designed to integrate data from multiple sources for additional operations on that data, for example, in reporting, controls, and operational decision support. Integration of data at the operational data store 112b may involve cleaning, resolving redundancy, checking against business rules, and other data integration techniques, such as data virtualization, federation, and extract, transform, and load (ETL). The operational data store 112b may also be a source of data for an enterprise data store 112c, which may be used for tactical and strategic decision support.

The enterprise data store 112c may store information and data associated with reporting and data analysis, and may be instrumental to various business intelligence functions. For example, the enterprise data store 112c may be one or more repositories of integrated data (e.g., from the operational data store 112b) and used to store current and historical data and to create analytical report(s) for advanced enterprise knowledge. Data passed through the enterprise data store 112c may also involve cleansing to ensure data quality and usage. ETL may also be used, as well as other techniques, involving staging, data integration, and access features. Ultimately, data in the enterprise data store 112c may be transformed and catalogued so that it may be used for data mining, analytics, and other business intelligence purposes, such as marketing, decision support, etc. Other data stores may also be provided in the enterprise hub 111, such as data marts, data vaults, data warehouses, data repositories, etc., all of which may be implemented and leveraged for more efficient digital content management.

It should be appreciated that the data stores described herein may include volatile and/or nonvolatile data storage that may store data and software or firmware including machine-readable instructions. The software or firmware may include subroutines or applications that perform the functions of the system 100 and/or run one or more application that utilize data from the system 100. Other various server components or configurations may also be provided.

The enterprise hub 111 may further include a variety of servers 113a and 113b that facilitate, coordinate, and manage information and data. For example, the servers 113a and 113b, as well as others described herein, may include any number or combination of the following servers: exchange servers, content management server, application servers, database servers, directory servers, web servers, security servers, enterprise servers, and analytics servers. Other servers to provide data security and protection may also be provided.

The enterprise hub 111 may also include an analytics system 200. The analytics system 200 may include various layers, processors, systems or subsystems. For example, the analytics system 200 may include a data access interface 202, a processor 203, a data management subsystem 206, a computation management subsystem 214, and an output interface 222. Other layers, processing components, systems or subsystems, or analytics components may also be provided. It should be appreciated that the data management 208 and computation management 214 may be other processing components integrated or distinct from processor 203 to help facilitate data processing by the analytics system 200 as described herein. Features and functionalities may be particularly helpful in data management, predictive analytics, and machine learning.

There may be many examples of hardware that may be used for any of the servers, layers, subsystems, and components of the analytics system 200 or the digital content management system 100 described herein. For example, the processor 203 may be an integrated circuit, and may execute software or firmware or comprise custom processing circuits, such as an application-specific integrated circuit (ASIC) or field-programmable gate array (FPGA). The data access interface 202 and output interface 221 may be any number of hardware, network, or software interfaces that serves to facilitate communication and exchange of data between any number of or combination of equipment, protocol layers, or applications. For example, the data access interface 202 and output interface 221 may each include a network interface to communicate with other servers, devices, components or network elements (including any number of application programming interfaces (APIs)) via a network in the digital content management system 100. More detail of the analytics system 200 is provided in FIG. 2.

The digital content management system 100 may also include an applications layer 121. The applications layer 121 may include any number or combination of systems and applications that interface with users or user-interfacing tools in an enterprise or a personal environment. For example, the applications layer 121 may include statistical analysis applications 122, reporting applications 123, web and mobile applications 124, and enterprise applications 125.

The statistical analysis applications 122 may include systems or applications that specialize in statistical calculations or econometrics. These may include, but not limited to, those by Tableau®, Domo®, Salesforce®, JMP®, MATLAB®, QlikSense®, SPSS®, SAS®, State®, Alteryx®, Analytica®, etc. The reporting applications 123 may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc.

The web and mobile applications 124 may include Internet-based or mobile device based systems or applications of various users, namely those in an enterprise environment. The enterprise applications 125 may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application. In an example, these enterprise applications 125 may be external or remote to the enterprise hub 111.

It should be appreciated that a layer as described herein may include a platform and at least one application. An application may include software comprised of machine-readable instructions stored on a non-transitory computer readable medium and executable by a processor. The systems, subsystems, and layers shown in FIG. 1 or other figure may include one or more servers or computing devices. A platform may be an environment in which an application is designed to run on. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

It should be appreciated that a single server is shown for each of the servers 113a and 113b, and/or other servers within the systems, layers, and subsystems of the digital content management system 100, as described herein. However, it should be appreciated that multiple servers may be used for each of these servers, and the servers may be connected via one or more networks. Also, middleware (not shown) may include in the digital content management system 100 as well. The middleware may include software hosted by one or more servers, or it may include a gateway or other related element. Such middleware may be used to enhance data processing, edge-based analytics, or other related operations. Furthermore, it should be appreciated that some of the middleware or servers may or may not be needed to achieve functionality. Other types of servers, middleware, systems, platforms, and applications not shown may also be provided at the back-end to facilitate the features and functionalities of the digital content management system 100.

The digital content management system 100, as described herein, may provide several benefits and advantages over conventional techniques. For example, the digital content management system 100 may reduce complexity of conventional systems that require manual resources or cumbersome coordination of several components or approaches. The digital content management system described herein may therefore allow an organization entity (e.g., commercial, financial, government, etc.) to engage with users and provide a deeper level of product support using account management and predictive analytics, especially in the creation of a lead analytical record and maximizing commercial leads of a SMB.

The digital content management system 100 may provide predictive analysis for forecasting potential customer engagement and spend, as well as for pricing products or services. Using this information, the digital content management system 100 may help a SMB prioritize and better develop its commercial actions, especially with regards to lead nurturing and closing potential sales. Furthermore, the digital content management system 100 may provide innovative ways to standardize data associated with leads, categorize such data, and provide predictive forecasting to generate a timeline of actions for closing any lead.

The digital content management system 100 may be platform independent. In other words, online applications associated with the digital content management system 100 may be used across various platforms, such as Windows, MAC, Unix, or other operating systems. The digital content management system 100 may also be hosted in the cloud, provisioned/accessed via the web, or provided locally/remotely via on-site premises.

Within the digital content management system 100, there may be a large amount of data that is exchanged, and the exchanged data may sensitive or personal. With new laws and regulations surrounding sensitive personal data in possession by organizational entities, the digital content management system 100 described herein may also provide a more robust approach to handle and process potentially sensitive personal data, as is required.

The General Data Protection Regulation (GDPR), for example, is a new regulation recently passed by the European Parliament (EP), the Counsel of the European Union (EU), and the European Commission (EC) in order to strengthen and unify data protection for individuals within the EU. The GDPR specifically addresses the export of personal data outside of the EU and aims to give control back to citizens and residents over their personal data, as well as to simplify the regulatory environment for international business. These and other new laws are having an impact to companies, organizations, and entities that are entrusted or in possession of private or personal data. In order to comply with these new laws and regulations, such as the GDPR, organizational entities may need to understand what data and information they possess, why they possess it, and the potential sensitivity of that that data. The digital content management system 100, as described herein, may therefore provide a more dynamic and scientific approach to provide monitoring, diagnostics, and analytics to using and processing such potentially sensitive data in an enterprise network.

Ultimately, the digital content management system 100 may allow an organization entity (e.g., commercial, financial, government, etc.) to improve customer engage and retention by providing a deeper level of support using digital management, lead generation, channel assignment, and predictive analytics and forecasting to provide a more expedient, less error prone, and more intelligent approach to help with nurture customers through the sales pipeline.

Figure 2:
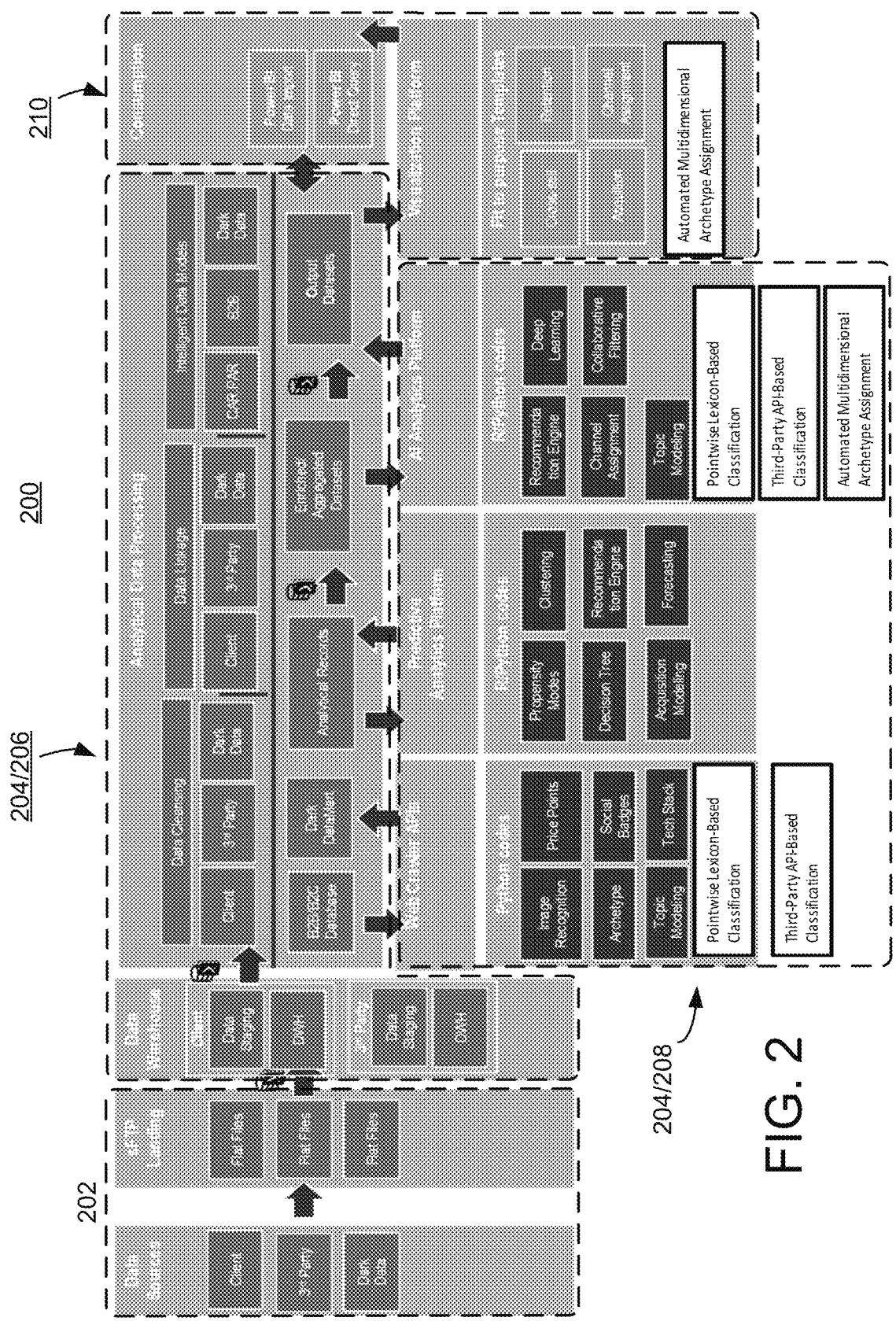
FIG. 2 illustrates a block diagram of components in an analytics system for digital content management and optimized channel assignment, according to an example.

FIG. 2 illustrates a block diagram of components in an analytics system 200 for digital content management and optimized channel assignment, according to an example. Although the analytics system 200 shown in FIG. 2 is depicted in an integrated manner, it should be appreciated that the analytics system 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the analytics system 200 may provide digital content management using channel assignment and predictive analytics and forecasting. In an example, the analytics system 200 may be an integrated system as part of the enterprise hub 111 shown in FIG. 1.

In the example of FIG. 2, data may be accessed via the data access interface 202. The data may originate from any data source, e.g., from the data source layer 101, enterprise hub 111, and applications layer 121 of the digital content management system 100 of FIG. 1, as well as other data sources not depicted. As shown in FIG. 2, the data may originate from a client, third party, dark data, or other source. Such data may be received in a variety of formats. In some examples, data may be received via a secure file transfer protocol (sFTP) in one or more flat files. The data access interface 202 may optionally store some or all (or none) of the data in an optional data cache, which may be local or remote.

The imported data may then be passed to a data management subsystem 206 for processing prior to performing analytics. For example, the data management subsystem 206 may organize the data by grouping, ordering, transforming, or cleaning the data in such a way that facilitates input of the data into analytics processing. For example, the data management subsystem 206 may data warehouse staging (DWH) to stage client data, third party data, or other data received via the data access interface 202. As shown, this staged data may be transferred to an analytical data processing system. At the analytical data processing system, one or more transformation rules that specify one or more rules may be applied to the data for processing. In an example, the transformation rules may be accessed from storage (e.g., from data store). Additionally or alternatively, the transformation rules may be input by a user. For example, the data management subsystem 206 may provide a user interface to a user that enables the user to specify one or more transformation rules. The data management subsystem 206 may also implement data management without rules (e.g., non-rule-based) and rely on other data management schemes.

The data management subsystem 206 may identify different types of variables that are specified by the user, and separate the variables according to the identified type. Some types of variables may be used as inputs to the analytics process, while other types of variables may be used evaluation criteria to evaluate the resulting analytics solutions. As such, the system 100 may enable not only automated processing of data, but also automated evaluation of the resulting analytics solutions. As shown, the analytical data processing may provide data cleansing, data linkage, and intelligent data models. The functions and features of the analytical data processing system of the data management subsystem 206 will become apparent in the detailed discussion of various examples provided below.

The data management subsystem 206 may interact and communicate with the computation management subsystem 214. For example, the data management subsystem 206 may send the processed data to the computation management subsystem 208 for further processing. In some examples, the computation management subsystem 214 may use web crawler APIs, predictive analytics platform, and artificial intelligence (AI) platform to provide supervised learning algorithms, that may or may not be based on generalized heuristics, to the computation process to help provide predictive analytics and forecasting solutions. For example, the supervised learning algorithms and/or techniques may help create the lead analytical record and provide mapping and strategies for nurturing and closing leads. It should be appreciated that the computation management subsystem 208 may also provide a user interface that shows the user the progress of the AI-based machine learning solutions and analysis. The functions and features of the computation management subsystem 208 will become apparent in the detailed discussion of various examples provided below.

The analytics system 200 may also include an output interface 210. In some examples, the output interface 210 may include a visualization platform, as shown, to help report or present solutions created by the data management subsystem 206 and/or the computation management subsystem 208. This may be achieved via fit-to-purpose visualization templates, including templates for customer cross-sell, retention, acquisition, and channel assignment. Other various visualization templates may also be provided. It should also be appreciated that the output interface 210 may also provide output data for consumption at other processing sources, including other business intelligence (BI) sources, like those in the applications layer 121 of FIG. 1.

In some implementations, the output interface 210 may also provide feedback information to the analytics system 200 or other systems in the digital content management system 100. For example, a solution export subsystem (not shown) may provide feedback information to an external rules engine (or other feedback component) (not shown), which may, for instance, use the feedback information to adapt one or more transformation rules. In this way, the analytics system 200 may be fine-tuned to provide improved and more accurate calculations and computations.

It should be appreciated that the analytics system 200 may provide various AI-based machine learning, including clustering, modeling, simulation, predictive analytics, use of knowledge graphs, as well as various other statistical or data-driven approaches, such as decision trees, etc., to help build and create a lead analytical record, which may improve customer or product support, all the while minimizing risk to an organization entity, reducing cumbersome processes, and enhancing efficiency for both an organization and its clients, especially as it pertains to closing leads and improve sales.

Figure 3:
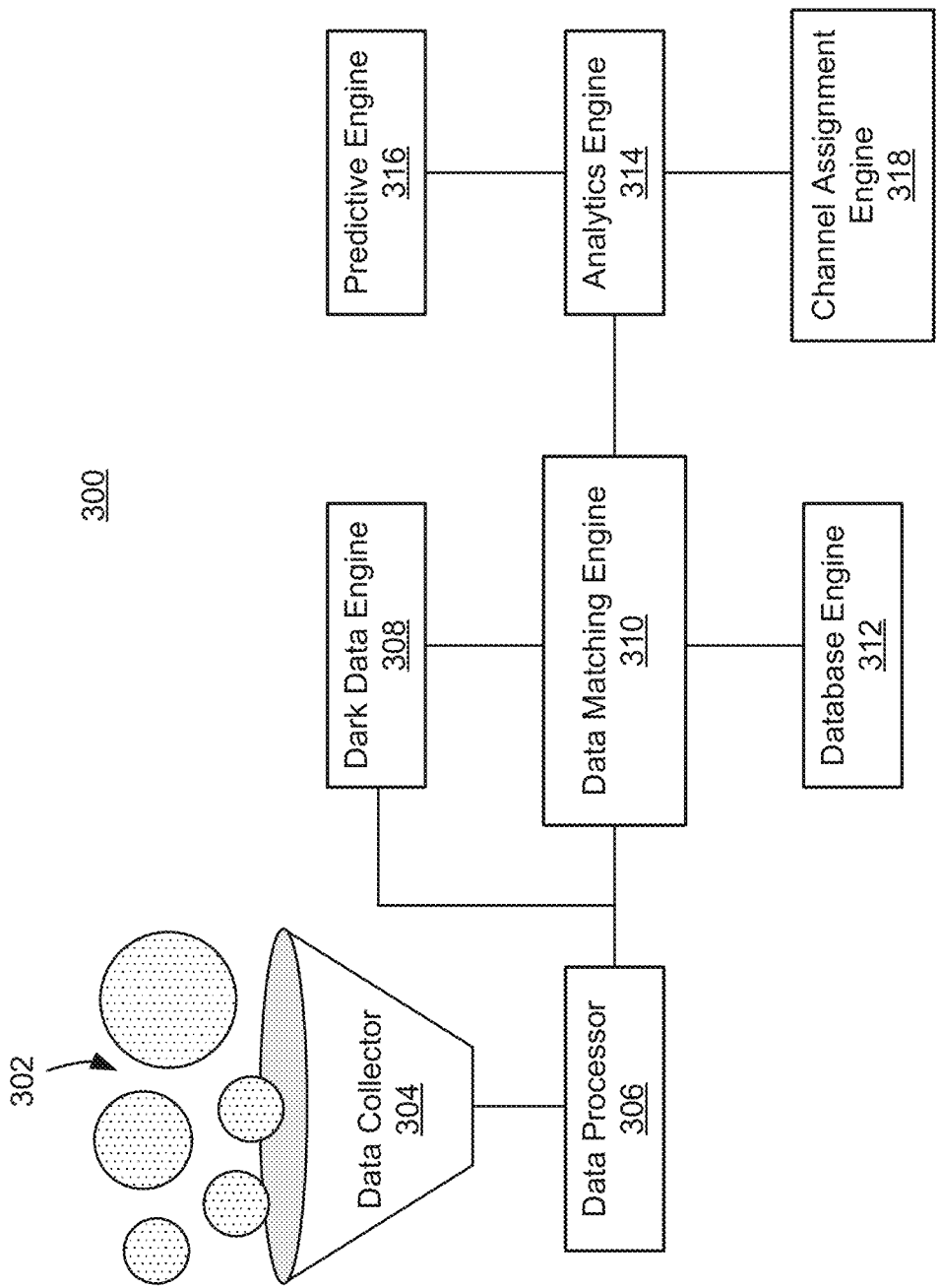
FIG. 3 illustrates a data flow diagram for digital content management and optimized channel assignment, according to an example.

FIG. 3 illustrates a data flow 300 for a digital content management system for account management and predictive analytics, according to an example. As shown, initial data 302 may be collected and acquired at a data collector 304 from any number of data sources, such as those shown in FIG. 1. The collected data may then be processed at the data processor 306. The processed data may then be transferred to the dark data engine 308 and the data matching engine 310, which may receive data from a data engine 312, e.g., a business-to-business B2B database engine. Once the data is matched, the data may be further processed at an analytics engine 314, which may coordinate with a predictive engine 316, and output the processed data to a channel assignment engine 318. The functions and features of these and other components will become apparent in the detailed discussion of various figures and examples provided below.

Figure 4:
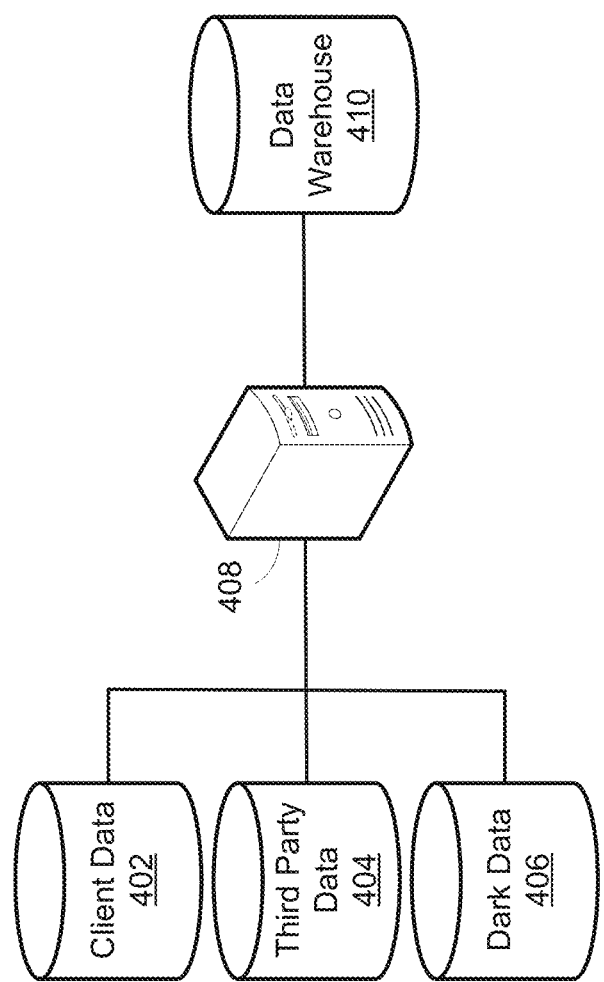
FIG. 4 illustrates a block diagram for data collection at a digital content management system, according to an example.

FIG. 4 illustrates a block diagram for a data collection process at a data collector 304 of FIG. 3, according to an example. The data 302 collected at the data collector 304 of FIG. 3 may be raw data, and may include data received or extracted as client data 402, third party data 404, or dark data 406. Client data 402 may include data with limited attributes provided by a client. For instance, client data 402 may be harnessed to identify a unique identifier for a lead. Third party data 404 may be data available from any number of third-party vendors. In some examples, a detailed analysis may be carried upon such third party data 404 to identify relevant and/or productive fields the digital content management system 100. Dark data 406 may refer to data that is being scraped from any number of SMB websites or other publicly available source. For example, web crawlers may be deployed to gather the dark data 406. Other types of data 302 may also be collected.

The data collector 304 may include a server 408. In some examples, the server 408 may be a staging server, which may be responsible for extraction of raw data from multiple data sources. The data collector 304 may also help prepare the collected data for further processing. In some examples, the data collector 304 may extract raw data from a data source, load the data via any number data transfer protocols (e.g., SSH protocols) in the data server 408, and reading and/or converting each attribute from the data into a desired format for further downstream operations. For example, the server 408 may load the data 302 into a data warehouse 410 (e.g., Google® cloud database). In this way, the data collector 304 may begin a data standardization process for the digital content management system 100.

Figure 5:
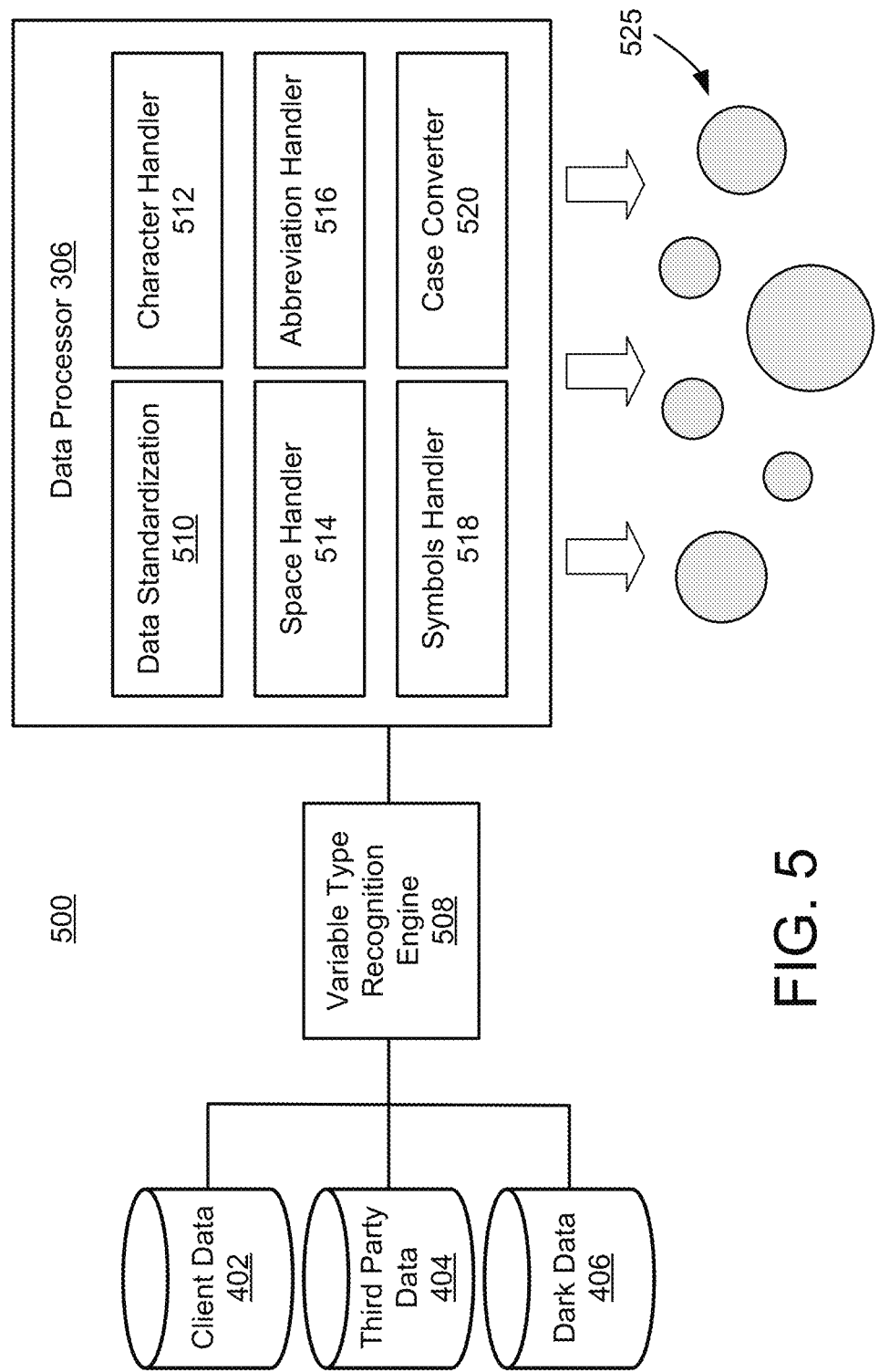
FIG. 5 illustrates a block diagram for data processing at a digital content management system, according to an example.

Once collected, the data 302 may be processed by the data processor 306. FIG. 5 illustrates a block diagram 500 for data processing at a digital content management system, according to an example. The data processor 306 may clean and standardize data from different data sources. As shown, this data may include client data 402, third party data 404, and dark data 406. A variable type recognition engine 508 may be used to implement a variable type recognition algorithm and/or technique. In some examples, the variable type recognition engine 508 may be used cleaning and normalizing data across various file types in order to prepare the data, among other things, for deduping, enrichment, scoring, etc.

In some examples, the data processor 306 may also interlink data together resulting in a more "three-dimensional" view for various SMBs. For instance, same or similar attributes of data from different data sources may be treated with similar cleaning actions to make the data more uniform. The data processor 306 may include multiple rules, algorithms, and techniques to handle a variety of cleaning or standardization issues for any unstandardized data that may be received. For example, the data processor 306 may include subsystems to handle general data standardization 510. In addition, the data processor 306 may specifically handle, for example, data processing for characters (via character handler 512), spacing (via space handler 514), abbreviations (via abbreviation handler 516), symbols (via symbols handler 518), and cases (via case converter 520). In this way, the data processor 306 may clean and standardize received data and output as processed data 525, which may be ready for further processing, such as for data matching.

Ultimately, the data processor 306 may help ensure the cleaned and standardized data is completed and maximized for matching as data anomalies may escalate if left untreated. Thus, cleaning and standardizing the data may help mitigate and normalize data for additional processing, e.g., matching, analytics, etc. In some examples, data attributes, like name, phone number, zip code, email address, may undergo various actions or further treatment.

Examples of cleaning and standardizing an organization's name, phone number, zip code, email or web domain, email address may be provided as follows:

Organization Name Cleaning:
  Remove all leading, trailing, and extra in-between blanks.
  Convert all characters to UPPERCASE
  EX: Aux Music, Inc.→AUX MUSIC
  Remove the following strings: "http, @yahoo, THE, @GMAIL, @GAMIL, Yahoo, Instagram, www., .com"
  EX: JAZMINT@YAHOO.COM JAZMINT
  Remove the following common abbreviations & notations:
    INC, INCORPORATED, INCORPORATION, ORG, ORGANIZATION, CO, CORP, CORPORATION, LLC, PVT, LTD, PRIVATE
    EX: 1020 DIGITAL LLC→1020 DIGITAL
  Replace plural form of words with singular:
  SERVICES with SERVICE, COMMUNICATIONS with COMMUNICATION, TECHNOLOGIES with TECHNOLOGY
  Remove all special characters
  Special Characters: #?/\{ }( )[ ],< >:;"""~+-*|%$@!'^=-_
  Replace similar words like identified company names containing words like DELETE, COOKIE, DONOTUSE, ERROR, DUPLICATE etc. and created Remove Flag them
  BIG COMMUNICATION Phone Number Cleaning:
  Remove all special characters & spaces except for "+" and keep only numeric characters 0-9
  Special Characters: #?/\{ }( )[ ],< >:;"""~+-*|%$@!'^=-_
  If number starts with +1 or +001 or no special characters, then tag as US number. If number starts with '+' followed by any other number, then Non-US
  EX: +15612305777→US, +6469154126→Non-US
  If Length of number is less than 10 then tag as invalid phone number EX: 960E+11→Invalid, 461E+114→Invalid
  If length of phone number (after +1 or +001 or no +) is 10 digits, then valid number. If Length is >10, then keep first 10 digits EX: 487667896→Invalid, 81362738450→8136273845

Zip Code Cleaning:
  Remove all characters except digits 0-9
  Remove blank spaces
  Check Zip Code length
    a) If less than 5, add leading 0's to make zip code 5 digits long
      i) EX: 07→00907, 12→00012
    b) If greater than 5, keep only first 5 digits
      i) EX: 3684000→36840, LIMA 05→00005
  Check for only 0s; if zip code contains only zeros, make it blank
    a) EX: 0'/'00'/'000'/'0000'/'00000'→" "

Email/Web Domain Cleaning:
  Parse out domain (e.g. take the string to the right of "@" symbol)
    a) EX: GABRIELLE@ANIMALZ.CO→ANIMALZ.CO, SCULHA@SNAP.COM→SNAP.COM
  Remove prefixes & suffixes from web address, including: www, http, https, corn, gov, Edu, net
    a) EX: WWW.ADAPTLY.COM→ADAPTLY, HTTP://WWW.ADWATERMEDIA.COM/→ADWATERMEDIA
  Remove special characters from domain: Special Characters: #?/\{ }( )[ ],< >:;"""~+-*|%$@!'^=-_
    a) EX: DELAROSA00@ICLOUD.COM→ICLOUD, ADWATERMEDIA.COM/→ADWATERMEDIA
  Create Public Domain flag for the following domains
  'GMAIL', 'YMAIL', 'YAHOO', 'SNAPCHAT', 'SNAP', 'HOTMAIL', 'MSN', 'REDIFFMAIL', 'EMAIL', 'OUTLOOK', 'ICLOUD', 'AOL', 'MAIL', 'LIVE', 'ME', 'COMCAST', 'KW', 'EUROPE', 'FACEBOOK', 'HOME', 'YOUTUBE', 'AMAZON', 'PLAY', 'GOOGLE', 'FB', 'NONE', 'REDIFF', 'EUROPE', "YANDEX', 'QQ', 'ATT'

Email/Website Address:
  Remove spaces & compress

Once processed (e.g., clean and/or standardized), the processed data 525 may be further treated/processed at the dark data engine 308 and/or the data matching engine 310. The data matching engine 310 may also receive information from the database engine 312, which may be a business-to-business (B2B) database engine. The database engine 312 may gather data from different data sources and interlink them together. The database engine 312 may collect data from different sources and categorize them in different categories. These categories may include, but not limited to, the following: (1) Firmographics (e.g., Revenue, Advertising Spend, Employee Size etc.); (2) Tech Stack (e.g., Google® Ad Sense, Wildfire, Omniture, Pixels, Tag Managers, etc.); (3) Intent (e.g., Price Point, Payment Type Indicators etc.); and (4) Contact Data (e.g., phone number, email ID, website etc.).

It should be appreciated that the data may be ingested, cleaned, and standardized in a manner similar to what is described above, including actions like removing/cleaning/standardizing blanks, special characters, symbols, uniform case conversion, etc. to reduce or eliminate anomalies. Data matching algorithms or techniques may be provided then to match the corresponding third party and dark data to a correct lead. Matching may be carried out at multiple levels and between different attributes (e.g., organization name matching, phone number matching), and subsequently prioritization rules may be applied to identify a "best" match, as will be described in further detail herein. Accordingly, post matching the data corresponding to leads may be aggregated into a single data table, which may result in holistic view for leads (e.g., a lead analytical record (LAR) or business analytical record (BAR)).

The dark data engine 308 may utilize multiple web crawlers or scrapers to help in lead enrichment and channel assignment. In some examples, the dark data engine 308 may be a scalable engine that collects dark data from multiple website on real-time or near real-time basis, performs multiple operations, like text mining, scraping, topic modeling, Google® API processing, calculating customer fit score and digital intensity score, and providing channel assignment.

Figure 6A:
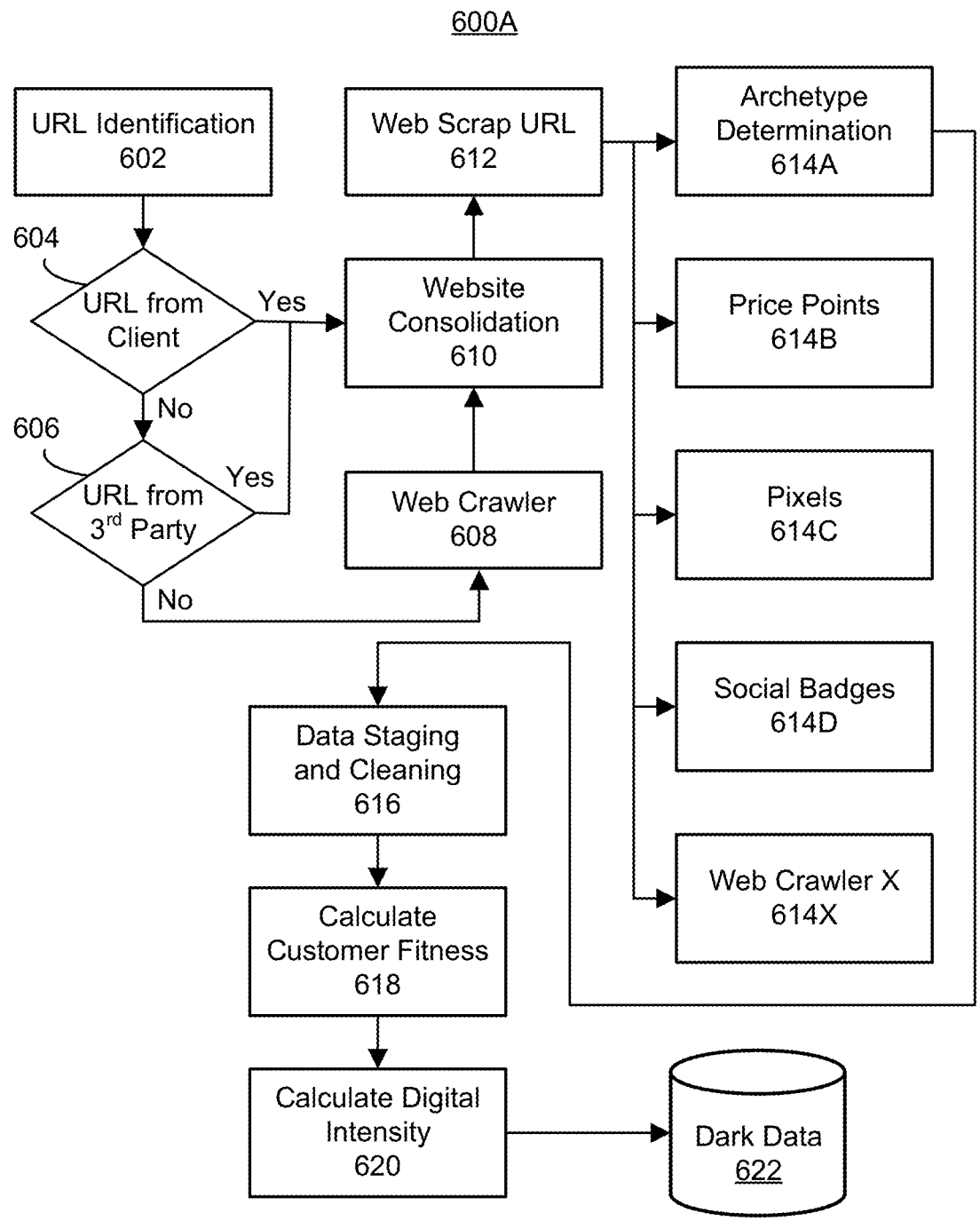
FIGS. 6A-6B illustrate a data flow diagram for dark data processing at a digital content management system, according to an example.
Figure 6B:
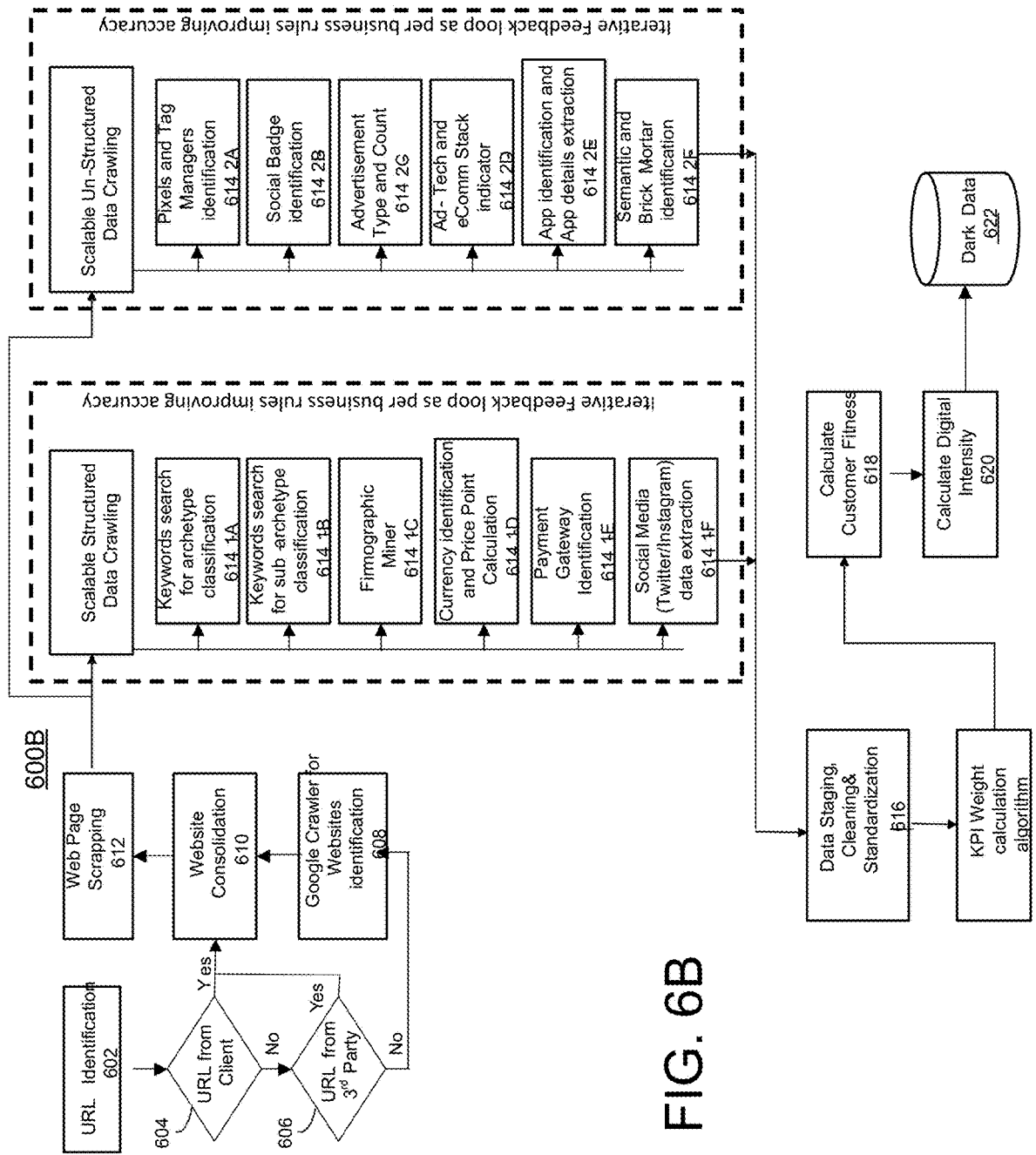

FIGS. 6A-6B illustrates a data flow diagram for dark data processing at a digital content management system, according to an example. Referring to FIG. 6A, the data flow 600A may begin with website or URL identification 602. This may include inputting business names and/or identifying official websites of leads through client data 604, third party data 606, or crawling structured websites 608 like Wikipedia, Google®, etc. For example, if a URL is not identified as being from a client 604, then it may look to see if the URL is from a third party 604. If the answer is "yes," then there may be website consolidation 610. If the answer is "no," then a web crawler 608 may be used. Either way, the data flow 600 may also provide an "intelligent" web scraping for URL 612.

Web scraping 612 may be performed an achieved in a number of ways. In some examples, web scraping 612 may be achieved using a python-based or Java-based application or algorithm. In some examples, cleaning the scraped web content by eliminating of HTML tags, CSS, style tags, script tags, meta tags, etc. The outcome may then be pure text content of a web page after removing various tags. Pattern Identification, regular expression search, page-hopping, JavaScript parsing, etc., and other processing techniques may then all be performed on clean and standardized web text. It should be appreciated that each rule used may be specific to a particular use case and likewise may be unique for any chosen web crawler.

In some examples, a web crawler 612 may have a specific indicator pertaining to the use case output. In some scenarios, this specific indicator may be used as a key performance indicator (KPI). In KPI generation, there may be a number actions that occur. These may include: (1) archetype determination or classification 614A; (2) price points 614B; (3) pixels 614C; and (4) social badges 614D. Other various actions may also be provided.

Archetype determination or classification 614A may involve categorizing websites into major categories. This may include, for example, eComm, App, Lead-Gen and Agency, which may be based on the content of websites. There may be rules defined for each classification is incorporated in the web crawlers which is utilized for identification. More specifically, these may be rules for searching for specific keywords/links/tags/regular expressions on the html page of an organization for identifying the archetype. Some sample algorithms that may be used may include beautiful soup, text pattern matching, and Multiprocessing/pooling. Archetype determination or classification 614A may also include cleaning scraped content, for example, by elimination of style, script tags etc. Archetype determination or classification 614A may also include Form detection from home page using form keyword search in the HTML tags. The input placeholder may be presented in the form used to identify the type of contact information being collected from user. Archetype determination or classification 614A may also include text mining using NLP (natural language processing) techniques, like lemmatization, stemming etc., which may be provided to extract cleaned data. Archetype determination or classification 614A may also include automated text cleaning done on the mined textual data to get a clean text output. Flagging of English/foreign language in the mined text may also be provided. In some examples, AI-based techniques may also be applied. This may include techniques, such topic modeling using a LDA Mallet model, Google® API processing etc. These techniques may be provided to help refine the results to get the most optimum set of topics and/or words.

It should be appreciated that sub-archetype classification may also be provided as part of archetype determination or classification 614A. Here, each archetype may further be divided into sub categories, as follows. For eComm, sub categories may include: beauty, fast food, travel, sports, music etc. For App, sub categories may include: gaming, food, finance, dating, travel etc. For Lead-Gen, sub categories may include: insurance, career, online classes, travel aboard, business solutions etc.

Determining price points 614B may include several actions. For example, in some scenarios, it may include determining min, max, average price of products along with currency and product description from home page using regular expression. Determining price points 614B may also include page hopping to products page to get additional price points. In some examples, determining price points 6146 may also include cleaning and standardizing prices and currencies.

Identifying pixels 614C may also be provided. For example, pixel and tag manager identification may include tracking pixels. This may be a type of e-marketing tool, in form of an HTML code snippet which is loaded when a user visits a website or opens an email. It may be useful for tracking user behavior and conversions. A tag manager may be designed to help manage the lifecycle these e-marketing tags. Some examples of popular tags managers may include Google® tag manager, Adobe® tag manager, etc.

Pixel and tag manager identification may include determining the html code and suitable tags within it for pixel identification and parse the same using python, or other code or language. Pixel and tag manager identification may also include use of regular expressions, hyperlink search, page hopping, JavaScript parsing for pixel and tag managers identification. pixel and tag manager identification may also include determining presence of pixels like Snap®, Pinterest®, Facebook®, etc. and tag managers like Adobe®, Google®, Tealium®, etc. on the homepage of a website were determined.

Social Badges identification 614D may also be provided. This may involve Determining presence of social media badge on a website like Facebook®, Twitter®, Instagram®, YouTube®, Yelp®, etc. Social Badges identification 614D may also include determining the html code and suitable tags within it for social badge identification and parse the same using python, or other code or language. Furthermore, social badges identification 614D may also include use of regular expressions, hyperlink search, page hopping, JavaScript® parsing, etc.

Other various KPI generation techniques for web crawler X 614X, where X represents an integer, may include advertisement count, social media data, ad-tech indicator, eComm stack indicator, payment gateway identification, application features, semantic scoring, brick-and-mortar scoring, etc.

For Advertisement count, this may include counting number of ads by different Ad Services namely Google® AdSense, Amazon®, Yahoo®, Bing®, AOL®, etc. Depending on hits for each website, calls the html code of the homepage of the site, using beautiful soup and selenium may be achieved. The dark data engine 308 may then strip tags and content which is not required (scripts and meta tags etc.), and identify the ad tags of various ad service providers and stores it as a flag in a data frame. In this way, a count of number of ads by each ad services providers may be taken and stored in a data frame.

For social media data, such as Instagram and Twitter® Data, the dark data engine 308 may determine the html code for presence of Instagram and Twitter® badge and parse for the same using python. Again, the dark data engine 308 may strip all the tags and content which is not required (scripts and meta tags etc.). Using a page-hopping technique, the dark data engine 308 may go to the social media page of the SMB and count no of followers, following, posts, likes, tweets etc.

The dark data engine 308 may also provide an Ad-Tech indicator. Ad tech (advertising technology) may refers to different types of analytics and digital tools used in the context of advertising. For example, these may include SEM (search engine marketing), display ads, retargeting, ad tracking, conversion from an ad. Thus, the dark data engine 308 may Identify the presence advertising tech stack e.g. Ad Roll, Ad sense, Google® remarketing etc. on webpage, both inbound and outbound. Each website may be hit, and the dark data engine 308 may call the html code of the homepage of the site, using beautiful soup and selenium or other technique or application. Again, all the tags and content which is not required (scripts and meta tags etc.) may be stripped. The dark data engine 308 may then identify the ad-tech services present on homepage of the organization using techniques like page hopping, text pattern matching, regular expression etc. This may similarly be achieved by eComm tech stack (e.g., Magento®, PayPal®, etc.). on webpage, as well as Payment gateways (e.g., MasterCard®, Visa®, PayPal®, Discover®, Amex®, etc.) on the eComm website page.

The dark data engine 308 may also use app features. This may include determining whether a website has link for its own app in Apple® store or Android® play store. It may also include fetching the link for play stores by parsing the html tags and page redirecting to the play store. Through html parsing, text extraction and selenium extract information may be performed on play store pages like ratings, downloads etc.

The dark data engine 308 may also perform various scoring features. This may include semantic scoring. Semantic scoring may categorize organization into three sematic categories: "Gen Z," "Millennial" and "others" based on content of websites. Using similar techniques described herein, the web crawler X 614X may identified keywords for age group-based categorization and computed their frequencies and crawl keywords to identify sites aligned to Gen Z, Gen Y age group. A similar scoring technique may be applied to Brick-And-Mortar Scoring as well. In some examples, this may involve determining the presence of Yelp Badge on a website. Used as a negative indicator, such scoring techniques may be used to penalize Leads that have a Yelp® badge on their site. The assumption here is that these leads may be are smaller leads with one brick-and-mortar presence and therefore less likely to spend at Client.

It should be appreciated that various AI techniques or machine learning may be performed on the crawled data. For example, this may include Automated Classification/Topic Modeling, which in turn may involve the following: (i) Importing packages, preparing stopwords, remove special characters, tokenizing keywords; (ii) Creating multigram models, lemmatizing multigrams; (iii) Building LDA classifier with dictionary and corpus, measuring model Quality (e.g., Perplexity and Coherence, Interactive Topic Visualization); and (iv) Optimizing LDA Classifier, visualizing and Extracting the Most Optimal Model. Other AI techniques may classify Content via API Calls, as well as Indexing & Labeling Multiple Text Files (e.g., via Google® API NLP Content Classification).

Pointwise Classification/Predictive Modeling may also be provided as another AI-based technique. This may include the creation of Categories Definition File and/or Semantic N-Grams-By-Category Definition File, Crawling Leads Using N-Gram-By-Category Definition File; Creating Classifier Function, and Scoring Leads by SCS (the Sum of N-Grams that Tagged TRUE), LSS to Measure Likelihood and Category Affinities The dark data engine 308 may also provide channel assignment for each archetype. Part of this may include calculating customer fit score 618. In other words, calculating customer fit score may include determining customer fit of a SMB using the data crawled from the web crawlers, assigning sub-scores for sub-archetypes, price-points (applicable only foe eComm Archetypes), millennial badge scores (Pinterest, Snapchat, Instagram), Influencer score (Instagram, Twitter) and Engagement Score (Instagram, Twitter) of organizations to calculate customer fit of leads and assign them into High, Medium, Low Groups. The following expression may be used:

$$\text{Customer Fit} = w_1 * \Sigma(\text{Sub-Archetype Score}) + w_2 * (\text{Price Point Score}) + w_3 * \Sigma(\text{Millennial Badge Score}) + w_4 * \Sigma(\text{Influencer Score}) + w_5 * \Sigma(\text{Engagement Score}) - w_6 * \Sigma(\text{Brick-And-Mortar Score}) + w_7 * \Sigma(\text{Semantic Score}),$$

where weights may be calculated as relative conversion rates based on a 5-point scale based on all leads with historical spend.

Calculating digital intensity score 620 may also be provided. A digital intensity score may include determining digital intensity of a SMB using the data crawled from the web crawlers, assigning sub-scores for various ad-tech, eComm stack, payment options types, other social badges (Facebook®, LinkedIn®, Twitter®, YouTube®) and pixels present on homepage of organization to calculate Digital Intensity of Leads and Assign them into High, Medium, Low Digital Intensity Groups. The following expression may be used:

$$\text{Digital Intensity Score} = w_1 * \Sigma(\text{Pixel Score}) + w_2 * \Sigma(\text{Social Badge Score}) + w_3 * \Sigma(\text{\# of Ad Tech}) + w_4 * \Sigma(\text{ECommerce Stack}) + w_5 * \Sigma(\text{Payment Type}),$$

where weights may be calculated as relative conversion rates based on a 5-point scale based on all leads with historical spend. The customer fit score, digital intensity score, and other data may be stored in operational data storage 622 or other storage.

Channel assignment may be achieved for all archetypes obtained. This may be achieved by the following: (i) create a minimart having all WebCrawler elements at Sales Intelligence Hub (SIH) ID level; (ii) Create the derived variables pertaining to digital intensity score; (iii) Create the derived variables pertaining to customer fit score; (iv) Calculate Customer Fit and digital intensity of Leads and Assign them into High, Medium, Low Groups; (v) Use both scores to assign channels to every lead; and (vi) Prioritize Leads within Channel based on Internal Funnel, Client Engagement and Marketing Engagement. Other various combinations, techniques, or examples may also be provided.

Referring to FIG. 6B, additional details are provided for scalable structured data crawling and scalable unstructured data crawling, as shown. Scalable structured data crawling includes, for example, keywords search for archetype classification 614-1A, keywords search for sub-archetype classification 614-1B, filmographic miner 614-1C, currency identification and price point calculation 614-1D, payment gateway identification 614-1E, social media data extraction 614-1F, etc. Scalable unstructured data crawling includes, for example, pixels and tag managers identification 614-2A, social badge identification 614-2B, advertisement type and count 614-2C, ad-tech and eComm stack indicator 614-2D, application identification and application details extraction 614-2E, semantic and brick and mortar identification 614-2F, etc. For both scalable structured data crawling and scalable unstructured data crawling, there may be iterative feedback loops as per business rules for improving accuracy.

Figure 6C:
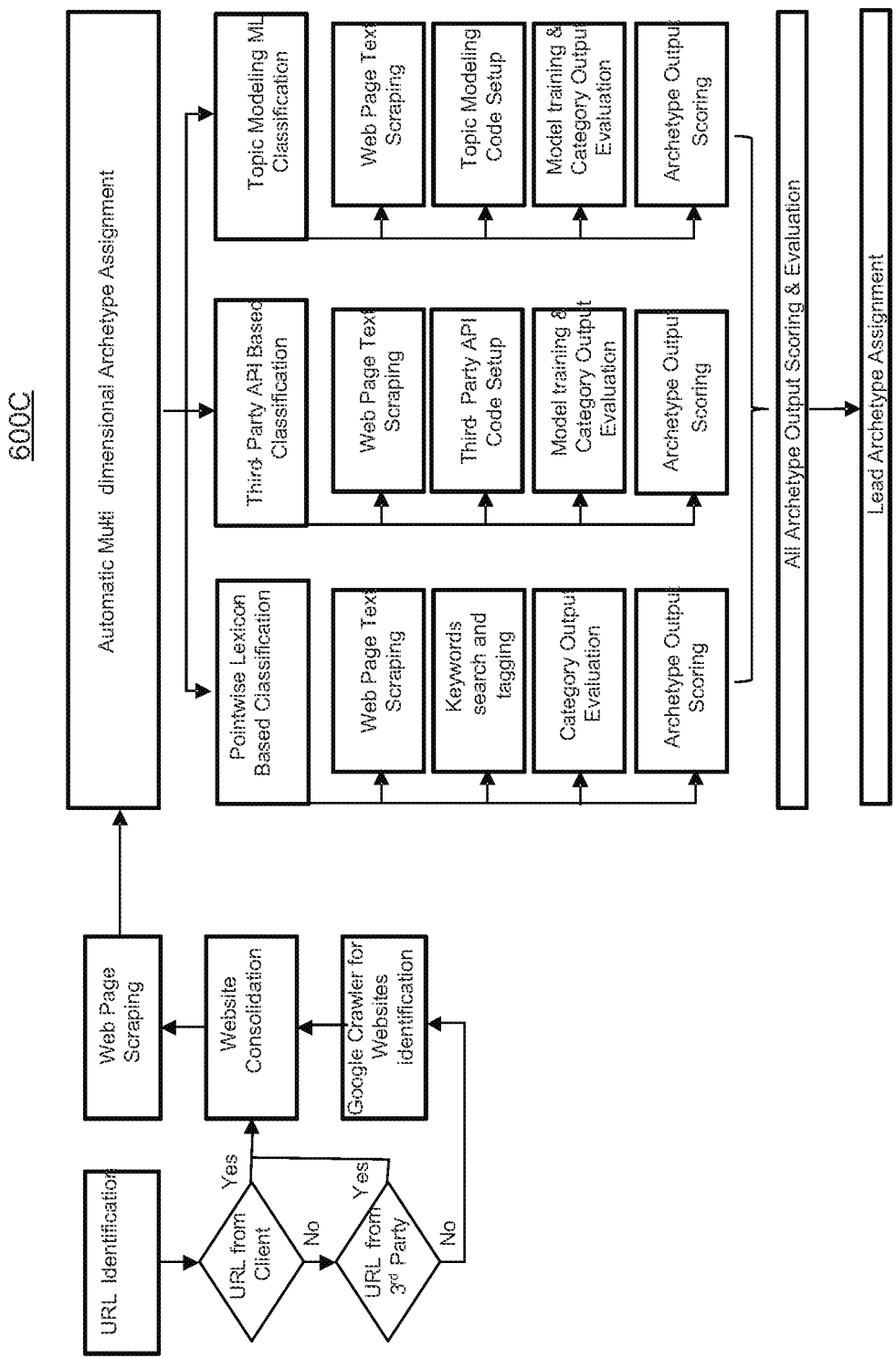
FIG. 6C illustrates a data flow diagram for classification techniques at a digital content management system, according to an example.

FIG. 6C illustrates a data flow diagram 600C for classification techniques at a digital content management system, according to an example. In some examples, automatic multi-dimensional archetype assignment. As described herein, automatic lead categorization may be an important feature, especially due to the large amount of data transmitted and available for analysis. Automated multi-dimensional lead categorization may use different kinds of classifiers, primarily those that are based on machine learning, third party APIs, and pointwise lexicon-based analytic approaches. Accordingly, a multi-dimensional lead categorization system may carry out a detailed derivation of its work principle. In some examples, a multi-dimensional archetype assignment may apply the approaches and techniques described herein to increase accuracy and reliability. In the process of lead scoring and qualifying, lead classification may be an important tool of lead analysis especially in improving channel assignment processes. An automatic multi-dimensional archetype assignment may, for example, utilize a comprehensive list of classification approaches to categorize the lead into various business verticals. It may be customized to categorize any user-defined categories by creating a set of keywords per category.

In some examples, a topic modeling machine learning classification approach may be provided. As shown, a topic modeling may be a machine learning and natural language processing classifier tool that is used for identifying distinct semantic structures and categories occurring within a data structure. As the name suggests, the topic modeling machine learning classification approach may include processing of automatically identifying categories present in a text object and to derive hidden patterns exhibited by a text corpus. Topic modeling may be different from rule-based text mining approaches that use regular expressions or dictionary-based keyword searching techniques, such as third-party API-based and pointwise lexicon-based classifiers described in this invention. Topic modeling may provide unsupervised machine learning approach used for finding and observing the set of keywords in large clusters of texts. The categories identified in topic modeling may be defined as "a repeating pattern of co-occurring terms in a corpus." For example, an output of a topic modeling for category "Shopping" may contain a following set of keywords: "shopping," "payment," "dress," "purchase," "sale," "clothing," "checkout," "store," etc. Topic modeling, in this case, may be useful for facilitating automatic multi-dimensional archetype assignment that enables lead retrieval from unstructured text and latent features, lead clustering, and lead organizing by their semantic and contextual data. While there are many approaches of obtaining topics from a text, topic modeling techniques may utilize a Latent Dirichlet Allocation (LDA) algorithm that assumes topics are produced from a mixture of documents. These topics may be generated keywords based on their probability distribution and likelihood to belong to that category. Given a dataset of documents, LDA as a matrix factorization technique may thereby determine type of topics to extract from the collection of documents. The extraction of optimal number of topics may be determined with divergence scoring methods. As shown in FIG. 6C, topic modeling may also involve document preparation steps such as compiling all documents into one corpus, cleaning and preprocessing to remove punctuations, special characters, stop words to normalize the corpus. Once the corpus is ready, it may then be converted into a document-term matrix representation necessary to run mathematical models. Once this is achieved, creation of an object for LDA model and training it on the document-term matrix may be provided. The final output of the LDA model may result in the set of topics along with the set of keywords per each topic.

It should be appreciated that a third-party API-based classification approach may also be provided where appropriate. For instance, a third-party API-based classification approach of lead categorization may utilize text classification APIs that allow extraction of entity, key phrases, topics, language identification and sentiment and syntax analysis. This approach may be based on RESTful API and works with either plain text or a URL. The third-party API-based classifier may also be an important component of automatic multi-dimensional archetype assignment, as it provides an alternative source of categorizing the leads not detected in machine learning topic modeling and pointwise lexicon-based approaches. The third-party API-based classification may also provide an access to a database of 700+ categories which makes it easy to label and classify a large dataset of text. This approach of classifying may thereby lead and crowd-sourcing category labels from third-party APIs may be achieved with a single API call. This technique may return a list of content categories that apply to a text document. It should be appreciated that these categories may range in specificity, from broad categories like "Shopping" to highly specific categories such as "Shopping/Women's Clothing/Pantsuits." The third-party API-based classification may then perform text annotation using the following methods below:

Content classification analyzes content and returns a content category label. For example, this method is performed by using classifyText function in Google® API's classifiers.

Entity extraction scans the text for known public figures, company names, destinations, and so on.

Sentiment analysis is used to identify prevailing emotional opinion within the text, ranging from positive, negative, or neutral.

Entity sentiment analysis is used to inspect a given text for known entities and return output about emotional opinion of those entities within a text.

Syntactic analysis is used to determine linguistic features of the text, breaking up the given text into sentences and word boundaries, providing further analysis of keywords.

It should be appreciated that a pointwise lexicon-based classification approach may also be provided. A pointwise lexicon-based approach may present an alternative method to lead classification that requires no labeled documents, instead, it uses a small set of keywords per category. The keywords per categories may be used to assign approximate labels to the unlabeled scraped text by term-tagging. These preliminary labels may become the starting point for a lead to be classified under a certain category. When classifying a complex data set of scraped data into a set of categories, the keywords alone may provide 45% accuracy. The classifier based on assigning points may reach 65% accuracy. This approach may then consider a text classifier without labeled training documents. In its place, pointwise lexicon-based approach may use a large data of scraped text and category-specific knowledge in the form of a few keywords per category and a category hierarchy. The approach thus may combine keyword semantic evaluation and weight assignment to correct and complete preliminary labeling provided by keyword tagging. Results show that accuracies close to, or maybe beyond, human agreement may be obtained using this approach. As an evidence domain, the technique may use scraped text from lead URLs and scans for a set of pre-defined categories using a set of keywords. The set of keywords per category may be defined in the beginning of the process by their semantic meaning and likelihood to appear in the given category. The keywords that were found in the text in the scraping process may then, tagged and assigned points per category, which is also known as a Semantic Category Score (SCS). The metric SCS may be used to measure a sum of category-specific keywords that have been identified and flagged. The keyword types such as single word "unigram," two consecutive written units of keywords "bigram," and three consecutive written units of keywords "trigram," may have their own SCS values and defined as follows:

$$SCS \text{ (Unigram)} = \frac{\text{Number of Total Tagged Unigrams}}{\text{Total Scraped Unigrams per Category}} \quad (1)$$

$$SCS \text{ (Bigram)} = \frac{\text{Number of Total Tagged Bigrams}}{\text{Total Scraped Bigrams per Category}} \quad (2)$$

$$SCS \text{ (Trigram)} = \frac{\text{Number of Total Tagged Trigrams}}{\text{Total Scraped Trigrams per Category}} \quad (3)$$

In some examples, these values may be used to measure and determine the likelihood of a lead belonging to a certain category, which is also known as Likelihood Semantic Score (LSS). The metric LSS of category may be defined as follows:

$$LSS \text{ (Category)} = \frac{SCS(\text{Unigram}) \cdot 10 + SCS(\text{Bigram}) \cdot 20 + SCS(\text{Trigram}) \cdot 30}{3} \quad (4)$$

Then, LSS of category may be become the input to a Category Affinity score used for measuring the category hierarchy. Category Affinity may be a percent metric of SCS and is used to prioritize leads by their ranking within a set of categories.

This classification method may be also used to perform text annotation using the following methods below:

Content classification analyzes content and returns a content category label.

Entity extraction scans the text for known public figures, company names, destinations, and so on.

Sentiment analysis is used to identify prevailing emotional opinion within the text, ranging from positive, negative, or neutral.

Entity sentiment analysis is used to inspect a given text for known entities and return output about emotional opinion of those entities within a text.

As discussed above, content classification may be achieved by searching a set of keywords per category in a given text, and assigning scores. Entity extraction, sentiment analysis, and entity sentiment analysis may also be achieved in a similar fashion, where a set of keywords consists of known entity labels, and/or keywords related to emotional opinion.

This approach may use a variety of keywords annotated by SCS metric, to decide the general assessment score of the given lead. The assets of this technique may or may not require any training data and may also be applied to unknown data structure. Given a set of categories and a set of keywords associated with each category, the approach may determine which categories exist within a text. The nature of this classification approach may also be polymorphic as the keywords tagged in the process can be associated with multiple categories. Other various examples may also be provided.

Figure 7:
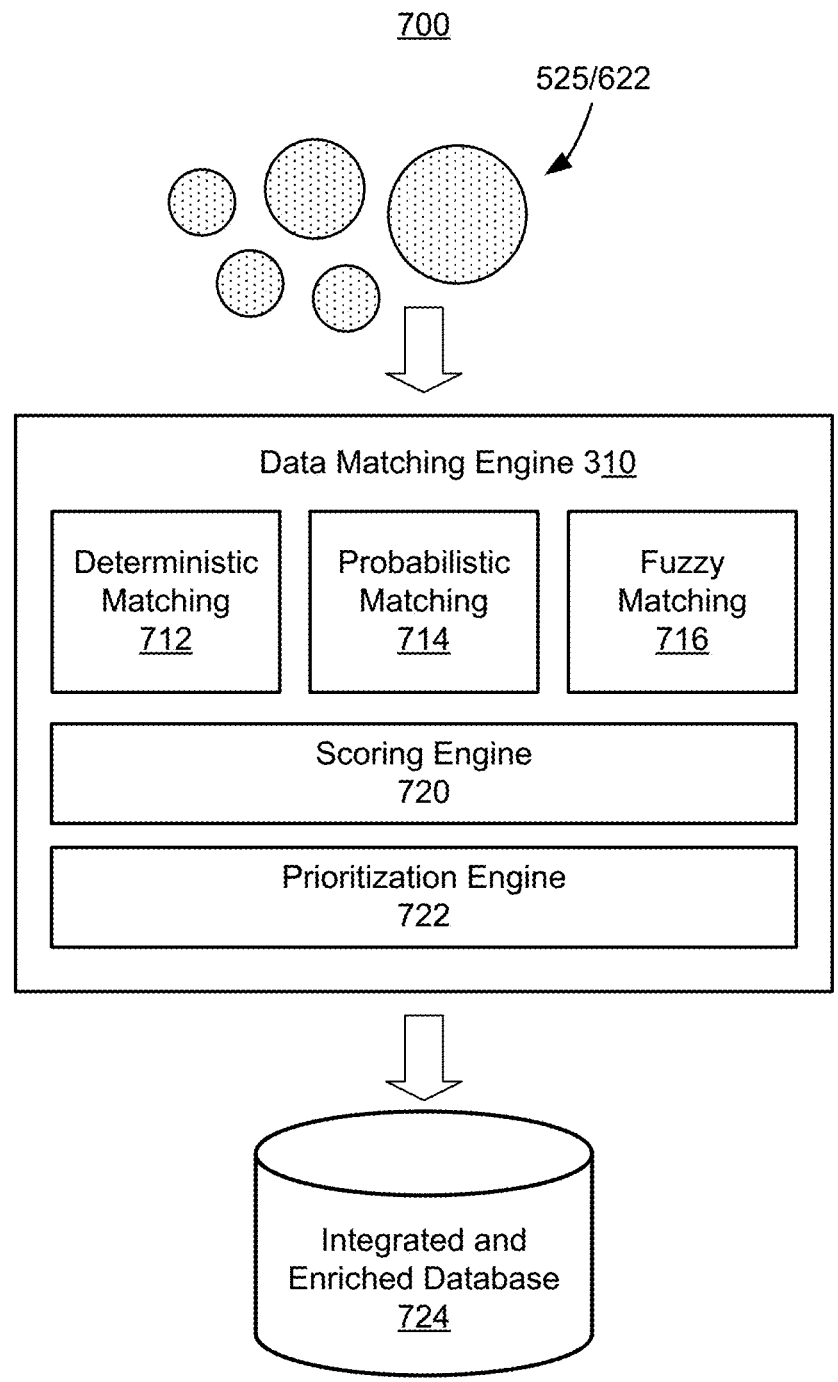
FIG. 7 illustrates a block diagram for data matching at a digital content management system, according to an example.

FIG. 7 illustrates a block diagram 700 for data matching at a digital content management system 100, according to an example. It should be appreciated that, in some examples, data matching may be performed against third party data sources for several key variables and for each potential SMB. For instance, processed data 525 and/or dark data 622, as shown may be transmitted to the data matching engine 310. The data matching engine 310 may provide a variety of matching techniques, such as deterministic matching 712, probabilistic matching 714, fuzzy matching 716, and/or other techniques, using key variables like name, zip code, website, email address, web domain, email domain, phone, or other variable.

In some examples, the deterministic matching 712 may be a reliable matching technique, and may be achieved by matching on more than one key variable. In some scenarios, deterministic matching 712 may provide an 80%-90% accurate match. Deterministic matching 712 may be iterative and multi-level matching. This may be achieved by matching on one key variable at a time or a combination matching process. Probabilistic matching 714 may rely on a proximity scoring algorithm, as well as distance matric calculations. Deterministic matching 712, together with probabilistic matching 714, and adding email domain or web domain with other key variables, may result in better accuracy as well.

Fuzzy matching 716 may provide lower accuracy and reliability. However, a fuzzy matching 716 may provide a union of multiple algorithms like Soundex®, jarowinkler/levenshtein distance and using functions like Compged, Complev, etc., which when combined, may result in an accuracy >80%. For example, in the event address matching is achieved by a rule that a successful match may be defined as an exact street address match and zip code match and the first three letters of organization name match, fuzzy matching 716 may include one or more Levenshtein-based fuzzy matching techniques that may enhance the results of the probablistic matching 714. This may result in an additional 3% accuracy.

Also, if combined to include an address match by combining with account name and zip code for example, this may result in fuzzy matching 716 with accuracy >90%. Once the data matching engine performs one or more of these matching techniques, a scoring engine 720 may measure respective confidence scores for each of the techniques. A priority engine 722 then rank and prioritize these into respective lead analytical records in an integrated and enriched database 724.

Below may be how the data matching engine 310 may perform, in accordance with an example:

Address Matching:
  Exclusion Rules:
    a) Records with missing Organization Name, Zip, or Address are excluded from matching process using the address variable
    b) Address pattern has been compared across ST/V12 and Client data where the two pre-requisites satisfied viz. Zip and first three characters of Company Name should match
  Definition of Successful Match:
    a) Street Address is exact match
    b) Zip is exact match
    c) First 3 characters of Organization Name is a match Web Domain Matching:
  Exclusion Rules:
    a) Records with missing Domain are removed
    b) Remove records they value containing "EMAIL", "OUTLOOK", "ICLOUD", "AOL", "SNAPCHAT", "SNAP", "MAIL", "LIVE", "COMCAST", "KW", "ME", "EUROPE" "FACEBOOK", "HOME", "YOUTUBE", "AMAZON", "PLAY", "GOOGLE", "NONE", "FB", "EUROPE"
  Definition of Successful Match:
    a) Domain is exact Match Email Domain Matching:
  Exclusion Rules:
    a) Records with missing Domain are removed
    b) Records flagged as Domain=Public during ingestion phase are removed
    c) Remove records they value containing "EMAIL", "OUTLOOK", "ICLOUD", "AOL", "SNAPCHAT", "SNAP", "MAIL", "LIVE", "COMCAST", "KW", "ME", "EUROPE" "FACEBOOK", "HOME", "YOUTUBE", "AMAZON", "PLAY", "GOOGLE", "NONE", "FB", "EUROPE"
  Definition of Successful Match:
    a) Domain is exact Match Phone:
  Exclusion Rules:
    a) Records with missing values are removed
    b) Records flagged as invalid or non-US are removed
  Definition of Successful Match:
    a) Phone Number is exact match Organization Name:
  Exclusion Rules:
    a) Records with missing Organization Name or where Organization Name is <2 characters are excluding from matching process
  Definition of Successful Match:
    a) Organization Name is exact match Zip Code:
  Exclusion Rules:
    a) Records with missing Zip are excluded from matching process
  Definition of Successful Match:
    a) Zip Code is exact match In some examples, there may be several actions taken to provide matching and to create the LAR. These may be as follows (in no particular order):
  Proceed to matches of third party on each cleaned variable from Client Tall file created after Client Data ingestion and cleaning;
  Consider the data from Client Tall file where the variable meets all the matching conditions;
  Dedup third party data on the variable (considered for matching), revenue and employee in decreasing order;
  Dedup Client Tall file data on the variable (considered for matching);
  Merge deduped third party data with deduped Client data on the matching variables and create match flags;
  Extract the Unmatched data into a separate data set;
  Consider the Unmatched data as base for next prioritized variable for incremental matches; and
  Append all the incrementally matched data along with their flags and the unmatched data.

In order to create a single source of unique lead records or LAR, which may be enriched with various 3rd party data including but not limited to firmographics, product information, Client archetypes, online marketing signals, contact info, etc., there may be several exemplary actions that may be performed. These may include (in no particular order):
  Merge all matched records and pull data from $3^{rd}$ party and create data at record level;
  Create roll-up flags required for clear to call, and also create clear to call flag;
  Create SIH ID (at organization name level). Logic of same SIH ID: same consolidated org name OR same email domain OR org name same as email domain;
  Create aggregated and derived variables from ST/V12/Client data. Also pull in wiki data for unmatched records;
  Create industry variables from sic2/naics. Also generate imp variables like revenue, employee, years in business and expense; and
  Roll-up all derived variables at SIH ID level to create LAR. Remove org names as blank or UNKNOWN.

Figure 8:
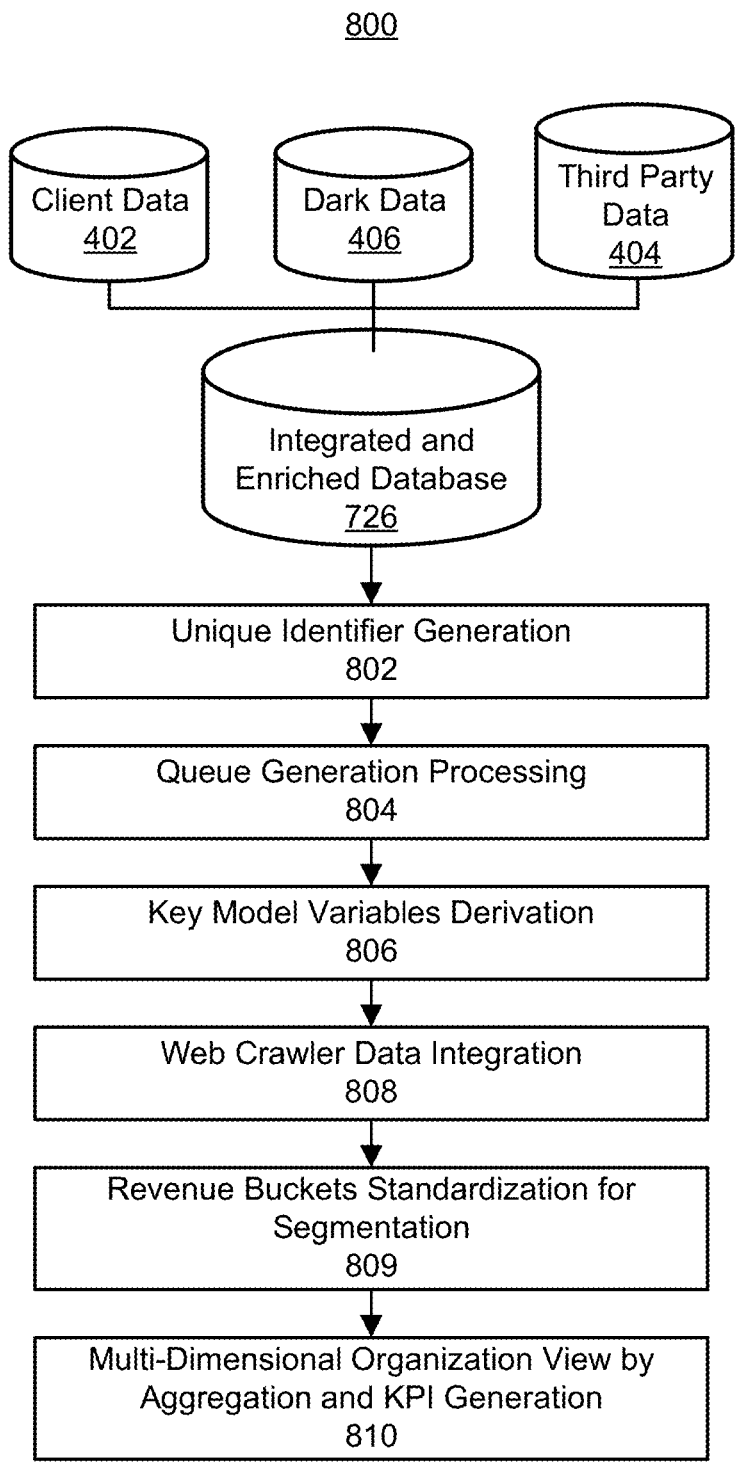
FIG. 8 illustrates a data flow diagram for creating a lead analytic record at a digital content management system, according to an example.

FIG. 8 illustrates a data flow diagram 800 for creating a lead analytic record (LAR) at a digital content management system 100, according to an example. As described herein, a lead analytic record (LAR) may be a single or unified source of unique lead records, which may be enriched with various third party data, including but not limited to: firmographics, product information, client archetypes, online marketing signals, contact info, etc. The lead analytic record may be created at the unique SIH ID level (this may be also known as the LAR).

As shown in FIG. 8, the integrated and enriched database 724 from the data matching engine 310 may receive client data 402, dark data 404, and third party data 406. In some examples, the integrated and enriched database 724 may merge all matched records and pull data from third party and create data at record level. As shown, the integrated and enriched database 724 may provide the following: unique identifier generation 802, queue generation processing 804, key model variables derivation 806, web crawler data integration 808, and multi-dimensional organization view by aggregation and KPI generation 810.

As described herein, the integrated and enriched database 724 may create roll-up flags required for clear to call may also be created. The integrated and enriched database 724 may also create clear to call flag that defines business rules that determine if a lead should or should not be contacted or not. This may be achieved by the following: Apply rules at the most granular record level in the Client data; Distribute flags at the SIH ID level (post de-duping phase); and/or Rules for clear to call leads.

In some examples, the following actions may be required for clear to call flag creation:
  i. Check type of organization, small business or not.
  ii. Check Lead Owner type
  iii. Check if record source
  iv. Check presence for fraud IDs
  v. Check if Organization Name has derogatory words, earmarked strings indicating duplicates or fake accounts
  vi. Check if Lead has existing engagement activity
  vii. Check if any of the opt out fields (like spam or do not contact) are true
  viii. Check if SFDC Lead/SFDC Account/Org is client related
    a. If conditions for either Logic 1 or Logic 2 are, then flag as true. Else false.
    b. Logic 1: If organization email has certain substring embedded in it, flag as true.
    c. Logic 2: If organization name contains 1st 4 letters which matched an earmarked substring, then flag as true.

Figure 9:
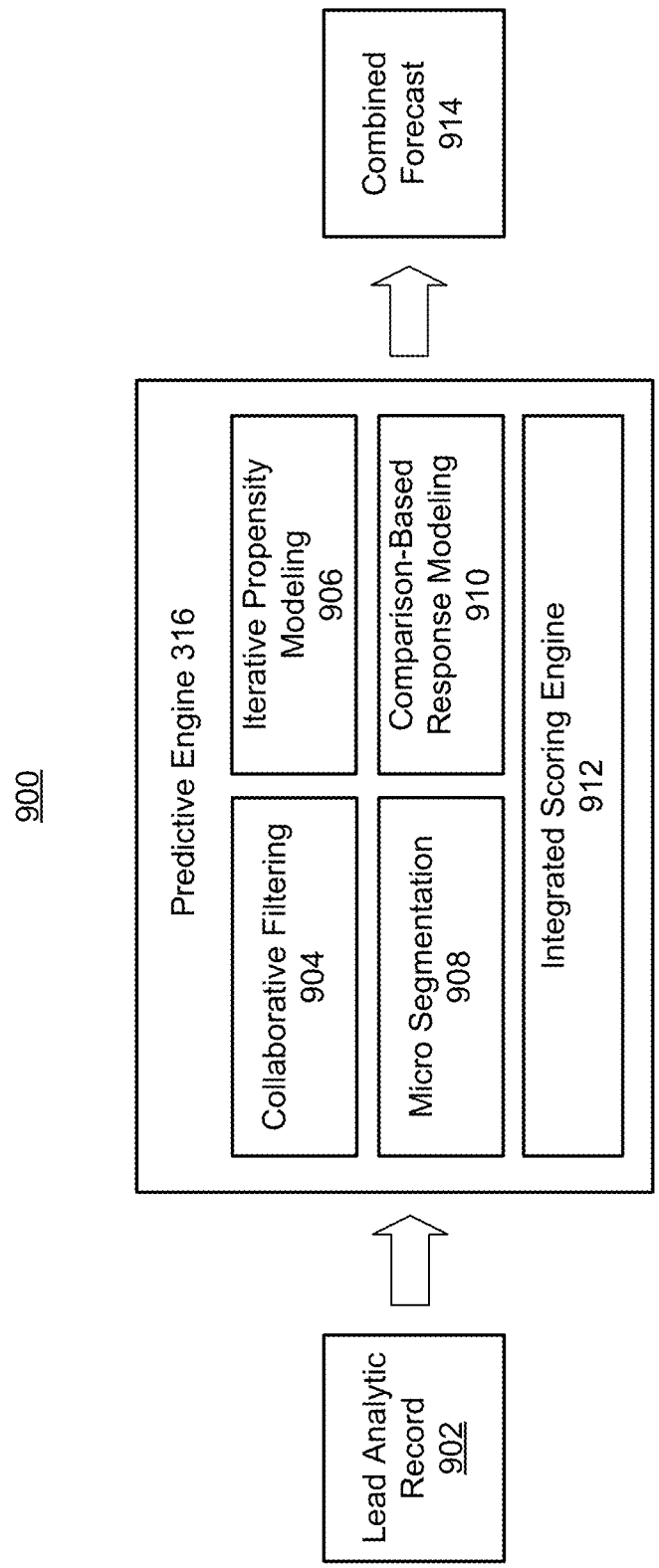
FIG. 9 illustrates a block diagram for predictive modeling at a digital content management system, according to an example.

In some examples, the Unique Identifier Generation 802 action may be achieved by the following:
  a. To group duplicate records across the various client files/databases and identify the true number of unique businesses.
  b. Unique businesses will be assigned a SIH ID that will serve as the foundation to the Lead Analytical Record, which will be processed for enrichment and scoring in later stages.
  c. Flags identified at the base record level (e.g. SFDC Lead, SFDC Account, BigQuery Org) will be distributed across the entire set of contacts fora unique business (in other words, clear to contact flags will be distributed across all records assigned with the same SIH ID).
  d. Create SIHID (at organization name level).
    a. Logic of same SIHID: same consolidated org name OR same email domain OR org name same as email domain A more detailed approach may include the following actions:
  Load SFDC Leads, SFDC Accounts, and BigQuery Orgs (see data ingestion for detailed steps)
  Cleanse Organization Name field in each file (see data ingestion for detailed steps)
  Merge files into single table
    a) Join SFDC Leads to BigQuery Orgs on Business Manager ID (aka Organization ID)
    b) Union table with remaining SFDC Lead records that do not match to Orgs
    c) Union table with SFDC Account records
  Remove records with blank Org Names
    a) Note that blanks may result from cleansing steps performed earlier in the process (e.g. Lead with Company Name="_____"" will be cleansed into a blank value after removal of special characters)
  Create unique SIHKEY/SIH IDs for distinct Organization Name values
  Group all duplicate Organization Names and assign same SIH IDs to each record
  Roll up the clear to call flags found at the Client record level to SIH ID level and distribute to each related record under the same SIH ID
2. Clear-to-call queue generation
  a. Rule based B,C-rating queue classification of the leads
3. Key model variables generated
  a. Create aggregated and derived variables from ST/V12/Client data. Also pull in wiki data for unmatched records
  b. Create industry variables from sic2/naics. Also generate imp variables like revenue, employee, years in business and expense
4. All data at record level summarized and rolled up at lead level
  a. Roll-up all derived variables at SIHID level to create LAR FIG. 9 illustrates a block diagram 900 for predictive modeling at a digital content management system 100, according to an example. It should be appreciated that SIH involves multiple predictive modeling algorithms. In some examples, predictive modeling may be achieved by the predictive engine 316, which may receive data from the lead analytical record (LAR) 902 from the analytics engine 314. The predictive engine 316 may then provide collaborative filtering 904, iterative propensity modeling 906, segmentation 908, and comparison-based response modeling 910.

In some examples, collaborative filtering 904 may provide for Ad Spend forecast. In other words, collaborative filtering may make automatic predictions (filtering) about the interests of a user by collecting preferences or information from many similar users (collaborating), and this may be achieved, for example, by:
  a. Subset base data into advertisers (account ever spend) and leads (prospects)
  b. Select the key variables based on business value for creating clusters and prioritize them based on their fill rate
  c. Create cluster type with multiple combination of key variables
  d. Create nano clusters in each cluster type considering all different possible values of key variables
  e. Calculate the ad spend forecast for leads based on average spend of advertisers in each cluster In some examples, iterative propensity modeling 906 may be provided to indicate likelihood of leads to spend. The iterative propensity modeling 906 may rely on and use logistic and machine learning (ML) algorithms, for example, to calculate the score of leads showing their likelihood to spend, and this may be achieved, for example, by:
 a. Subset base data into advertisers (account ever spend) and leads (prospects) to get the target base
 b. Select the key variables based on business value and prioritize them based on their fill rate
 c. Performed variable reduction approach like VIF, multicollinearity treatment and dropping insignificant variable
 d. Run model and diagnose the output to see stability of model, both in development and hold out sample. Also checked the accuracy
 e. Validation of model my multiple iterations of capping/missing value treatment on the selected set of variables, running and testing the model output.

In some examples, segmentation 908 may include micro-segmentation. Provide micro-segmentation may involve profiling advertisers in micro segments and overlaying advertiser micro segments on leads, and this may be achieved, for example, by:
 a. Subset base data into advertisers (account ever spend) and leads (prospects) to get the target base
 b. Data preparation and treatment by univariate analysis, outlier capping, missing value treatment
 c. Segments driven by underlying statistical patterns, not by business rules or man-made queries
 d. Capture homogeneous customers within each segment and Ensure significant differentiations among segments
  i. overlay advertiser micro segments on Leads with similar features and calculate the revenue forecast In some examples, comparison-based response modeling 910 may also be provided to capture key features of advertisers which are responding and use look-alike model to capture more such leads, and this may be achieved, for example, by:
 a. Use response data to segregate the target leads
 b. Select the key variables based on business value
 c. Insight analysis to see the pattern or features of responders. Put them into multiple segments if possible based on key variables
 d. Perform look-alike model to identity related leads with similar features Once these actions are performed, an integrated scoring engine 912 of the predictive engine 316 may provide scores for the leads, which in turn may be used for creating a combined forecast 914. Ultimately, it should be appreciated that the combined forecast 914 may be indicative of potential spend numbers.

Figure 10A:
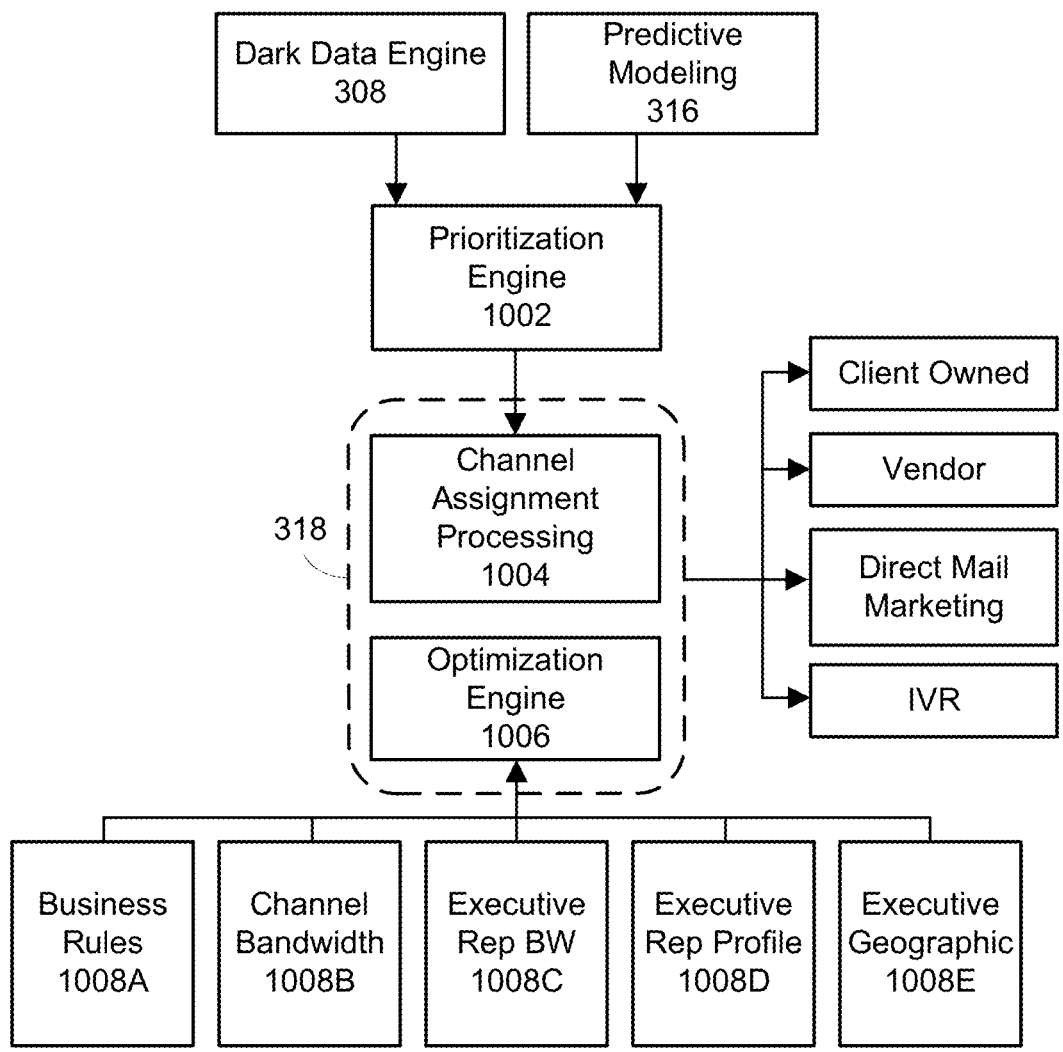
FIGS. 10A-10B illustrate block diagrams for channel assignment at a digital content management system, according to an example.

FIG. 10A illustrates a block diagram 1000A for channel assignment at a digital content management system, according to an example. As shown, data data engine 308 and predictive modeling 316 may provide data to prioritization engine 1002. The prioritization engine 1002 may prioritize data for the channel assignment engine 318. In some examples, the channel assignment engine 318 may include a channel assignment processing 1004 and optimization engine 1006. In some examples, the optimization engine may receive data from business rules 1008A, channel bandwidth 1008B, executive representative 1008C, executive representative profile 1008D, executive geographic 1008E, etc. The channel assignment engine 318 may communicate with downstream components, such as client owned, vendor, direct mail marketing, IVR (interactive voice response), etc.

Figure 10B:
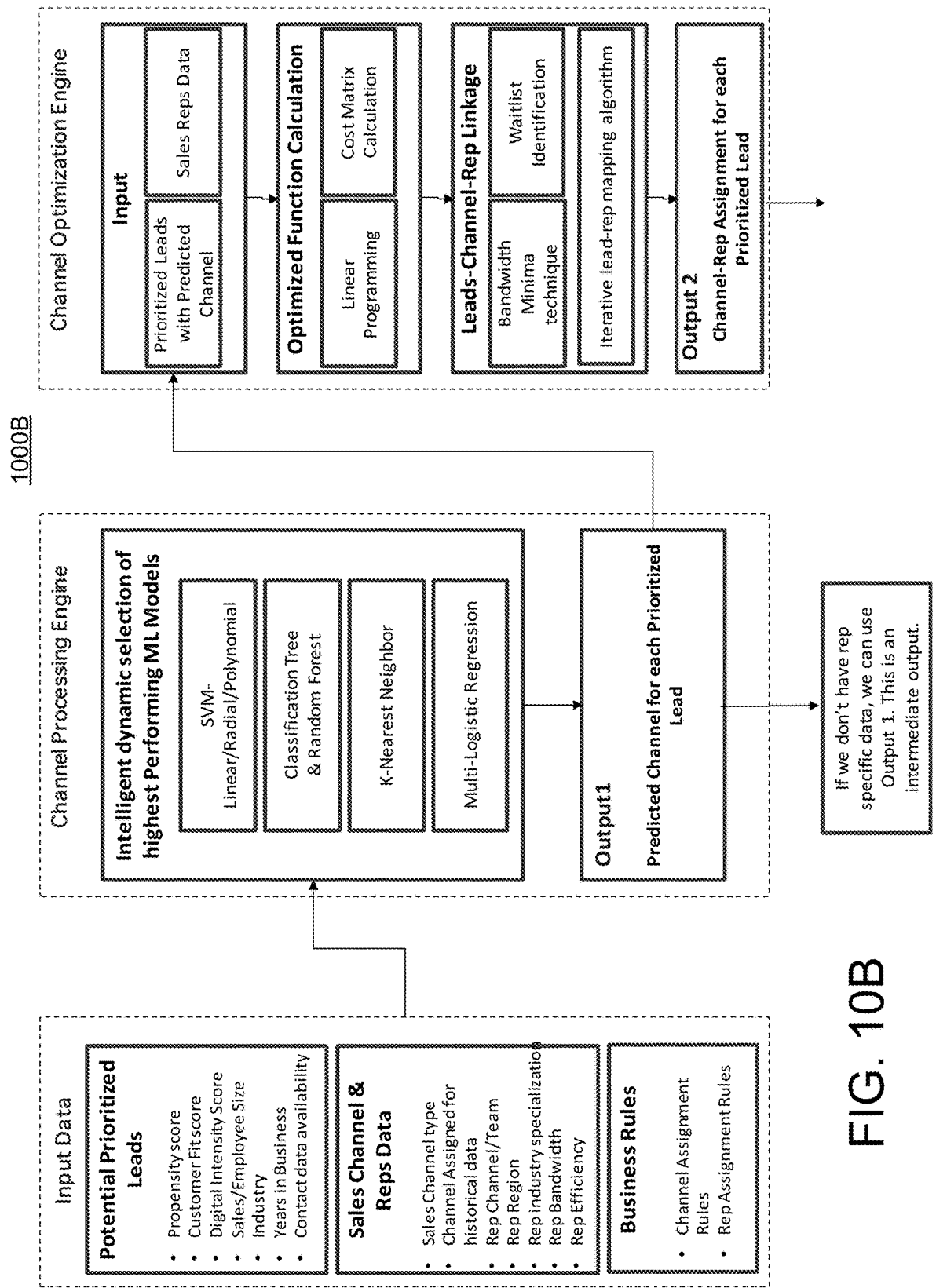

FIG. 10B illustrates a block diagram 1000B for channel assignment at a digital content management system, according to an example. FIG. 10B provides a specific example of channel processing and optimization shown in FIG. 10A. As shown in 1000B, the channel processing and optimization engine, here, may be an intelligent way of analyzing historical data, intelligent dynamic selection of machine learning techniques to get look-alike leads and predict the best possible channel, creation of best optimized algorithm for channel-rep-leads linkage using rep bandwidth optimization programming, and assigning the most productive and cost optimized channel-rep to each prioritized Leads. Details of the components of FIGS. 10A and 10B may be described as follows:

Input Data: Three types of data are ingested, plus additional business rules are applied
  Potential Prioritized Leads
   Propensity score
   Customer Fit score
   Digital Intensity Score
   Sales/Employee Size
   Industry
   Years in Business
   Contact data availability
  Sales Channel Data
   Sales Channel type
   Channel Assigned for historical data
  Reps Data
   Rep Channel/Team
   Rep Region
   Rep industry specialization
   Rep Bandwidth
   Rep Efficiency
  Business Rules
   Channel Assignment Rules
   Rep Assignment Rules
  Channel Processing Engine: This process uses prioritized leads data, sales channel data and business rules to produce predicted channel for each prioritized lead. This engine uses an intelligent dynamic selection of highest Performing ML Models which are:
   SVM-Linear/Radial/Polynomial
   Classification Tree—Gini/Entropy
   Random Forest
   K-Nearest Neighbor
   Multi-Logistic Regression
  Channel Optimization Engine: This process uses Prioritized Leads with Predicted Channel and sales reps data for final Channel-Rep assignment for each prioritized lead. It may consist of 2 major process.
   Optimized Function Calculation: This process uses integrated linear programming technique and cost matrix calculation to get the cost optimized rep for each channel based on individual lead's characteristics. The high-level function may be expressed as:

$$\text{Optimization Function} = ((\Sigma \text{Weight} \times \text{Features}) \pm (\text{Reward}^*/\text{Penalty}^*)) \times \text{Sales Rep Efficiency}$$

Features: Sales size, Propensity score, Customer fit score, Digital Intensity score
  Weight: can be defined as per the business requirement for every feature
  Reward: For same Region & Industry 1 & 0.75 respectively Penalty: For different Region & Industry −0.5 & −0.375 respectively
can be defined as per business
Leads-Channel-Rep Linkage: This is the final process of channel-rep assignment to prioritized leads using three techniques/algorithms
bandwidth-minima technique
Iterative lead-rep mapping algorithm
Waitlist Identification FIG. 11A-11B illustrate screens for a digital content management system using channel. FIG. 11A illustrates a quick example of how digital intensity score is calculated and assigned to leads based on web-crawling elements. For each website, four key web-crawling elements is captured. Value of each of these elements is multiplied with standardized weight assigned to each of these variables. Adding up all these will give the Digital Intensity score which is further bucketed into High/Medium/Low based on distribution of digital intensity score across leads, this bucket is finally assigned to each lead. Final equation would be as mentioned below:

Digital Intensity Score=Σ
((Ad_Tech_Score*Weight_Ad_Tech_Score)*
(eComm_Stack_Score*Weight_eComm_Stack_Score)
*(eComm_Payment_Score*Weight_eComm_Payment_Score)
*(Pixel_Score*Weight_Pixel_Score)).

FIG. 11B illustrates a quick example of how customer fit score is calculated and assigned to leads based on web-crawling elements. For each website, five key web-crawling elements is captured. Value of each of these elements is multiplied with standardized weight assigned to each of these variables. Adding up all these will give the Customer Fit score which is further bucketed into High/Medium/Low based on distribution of customer fit score across leads, this bucket is finally assigned to each lead. Final equation would be as mentioned below:

Influencer Score=Instagram_Engagement_Score+
Twitter_Engagement_Score

Customer Fit Score=Σ
((Category_Score*Weight_Category_Score)*
(Price_Point_Score*Weight_Price_Point_Score)
*(Badge_Millenial_Score*Weight_Badge_Millenial_Score)
*(Influencer_Score*Weight_Influencer Score)*
(Brick_and_Mortar
Score*Weight_Brick_and_Mortar_Score)), where "Brick_and_Mortar_Score" may represent a crowd-sourced review or rating score (e.g., Yelp Score).

Figure 12A:
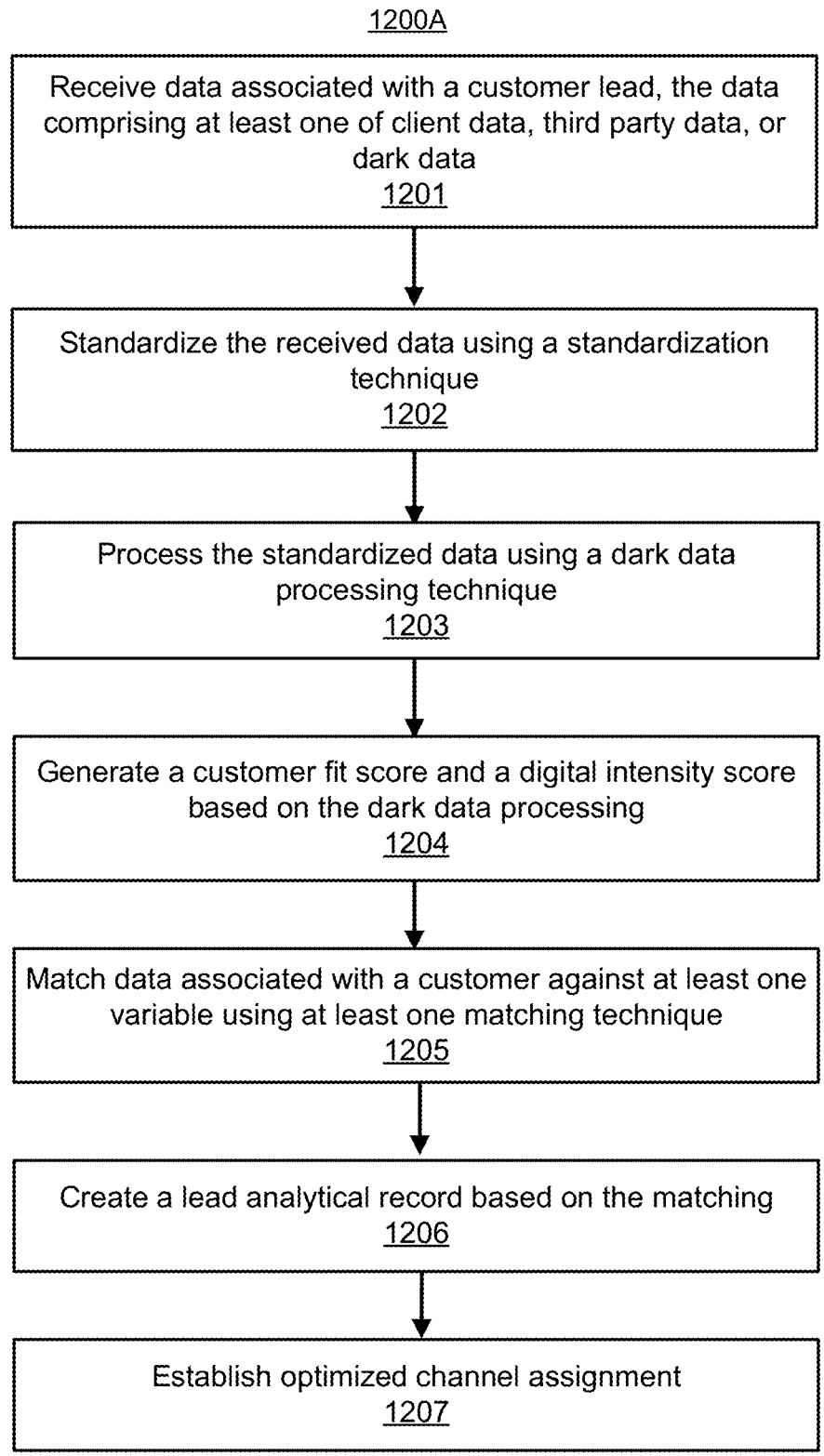
FIGS. 12A-12B illustrate flowcharts of a method for a digital content management system using channel assignment and predictive analytics, according to an example.

FIG. 12A illustrates a method for dialogue monitoring and communications, according to an example. The method 1200A is provided by way of example, as there may be a variety of ways to carry out the method described herein. Although the method 1200A is primarily described as being performed by systems 100 and 200 as shown in FIGS. 1 and 2, respectively, and data according to data flow 300 of FIG. 3, the method 1200A may be executed or otherwise performed by other systems, or a combination of systems. Each block shown in FIG. 12A may further represent one or more processes, methods, or subroutines, and one or more of the blocks may include machine-readable instructions stored on a non-transitory computer readable medium and executed by a processor or other type of processing circuit to perform one or more operations described herein.

At block 1201, the analytics system 200 may communicate with one or more servers and one or more data stores to provide digital content management in the network. The analytics system 200 may include a data access interface to receive data associated with a customer. In some examples, the data may include client data, third party data, dark data, or other data as described herein. In some examples, the client data may be data that comprises limited attributes provided by a customer, the third party data is data available from a variety of third party vendors, the dark data is data received from publicly available data sources, as described herein.

At block 1202, the processor may standardize the received data using a standardization technique. In some examples, the standardization technique may include cleaning and forming according to rules for characters, spaces, abbreviations, symbols, or cases, as described herein.

At block 1203, the processor may process the standardized data using a dark data processing technique. In some examples, the dark data processing technique may include identifying a website, and/or using a web crawler to receive data associated to archetype, price points, pixels, and social badges, as described herein. Other various examples may also be provided.

At block 1204, the processor may generate a customer fit score and a digital density score based on the dark data processing of the standardized data. As described herein, the customer fit score may be generated based on the following expression:

Customer Fit=$w_1$*Σ(Sub-Archetype Score)+$w_2$*(Price Point Score)+$w_3$*Σ(Millennial Badge Score)+$w_4$*Σ(Influencer Score)+$w_5$*Σ(Engagement Score)−$w_6$*Σ(Brick-And-Mortar Score)+$w_7$*Σ(Semantic Score), where $w_1$-$w_7$ represent weights that are calculated as relative conversion rates based on a 5-point scale based historical data. In some examples, the digital intensity score may be generated based on the following:

Digital Intensity Score=$w_1$*Σ(Pixel Score)+$w_2$*Σ(Social Badge Score)+$w_3$*Σ(# of Ad Tech)+$w_4$*Σ(ECommerce Stack)+$w_5$*Σ(Payment Type), where $w_1$-$w_7$ represent weights that are calculated as relative conversion rates based on a 5-point scale based historical data.

At block 1205, the processor may match received data associated with a customer against at least one variable using at least one matching technique. In some examples, the matching may involve matching third party data against the at least one variable. In some examples, the matching may be based on data from different sources and interlinking. In some examples, the variable may include at least one of name, zip code, website, email, web domain, email domain, phone number, etc., as described herein. Furthermore, the matching may involve deterministic matching, probabilistic matching, fuzzy matching, or other technique.

At block 1206, the processor may create a lead analytical record based on the matching. At block 1207, the processor may prioritize leads in the lead analytical record using a predictive modeling technique. In some examples, the predictive modeling may include collaborative filtering, iterative propensity modeling, segmentation, comparison-based response modeling, or other technique.

At block 1207, the processor may establish optimized channel assignment based on at least one of the customer fit score, the digital intensity score, the lead analytical record, or the matching and prioritization actions; and It should be appreciated that in some examples, the output interface may transmit, to a user device, at least one of the customer fit score, digital intensity score, lead analytical record, and optimized channel assignment a dashboard or report.

Figure 12B:
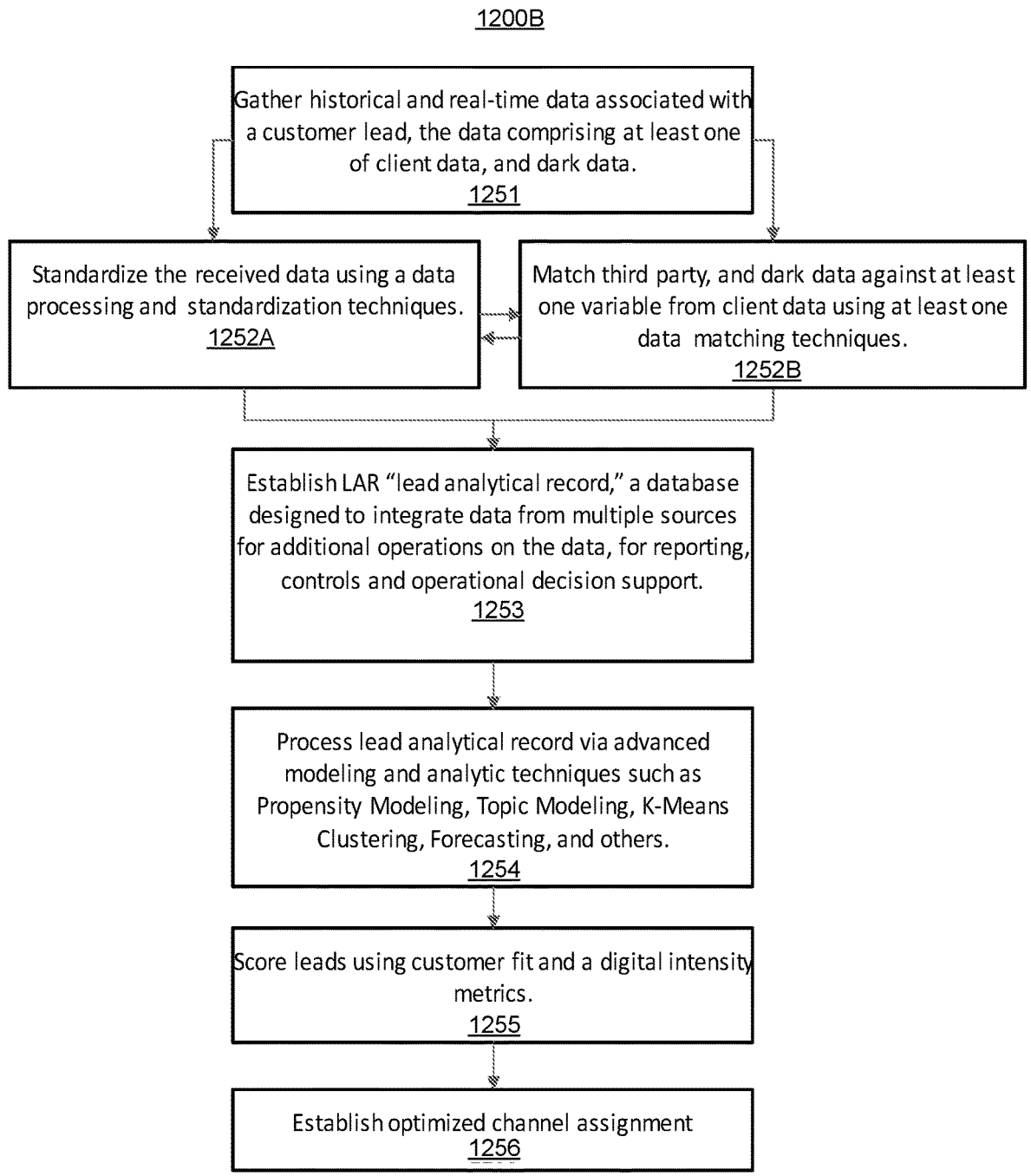

FIG. 12B illustrates a method for dialogue monitoring and communications, according to an example. The method 1200B is provided by way of example, as there may be a variety of ways to carry out the method described herein. Although the method 1200B is primarily described as being performed by systems 100 and 200 as shown in FIGS. 1 and 2, respectively, and data according to data flow 300 of FIG. 3, the method 1200B may be executed or otherwise performed by other systems, or a combination of systems. Each block shown in FIG. 12B may further represent one or more processes, methods, or subroutines, and one or more of the blocks may include machine-readable instructions stored on a non-transitory computer readable medium and executed by a processor or other type of processing circuit to perform one or more operations described herein.

At block 1251, the analytics system 200 may gather historical and real-time (or near real-time) data associated with a customer lead as described herein. In some examples, the data may include client data and/or dark data.

At block 1252A, the processor may standardize the received data using a data processing and/or standardization technique, as described herein. At block 1252B, the processor may match various data, such as third party data and dark data, against at least one variable from client data using a data matching technique, as described herein.

At block 1253, the processor may establish a lead analytical record (LAR). This LAR may be a database that is designed to integrate data from multiple sources for additional operations on the data. In some examples, these additional operations may include reporting, controls, operational decision support, etc.

At block 1254, the processor may process the LAR via advanced modeling and analytic techniques. For example, these may include, but not limited to: propensity modeling, topic modeling, K-means clustering, forecasting, and other techniques.

A block 1255, the processor may score leads from the LAR using customer fit and/or digital intensity metrics. At block 1256, the processor may establish optimized channel assignments accordingly, as described herein.

Although applications of AI-based analytics and machine learning using are directed mainly to dialogue monitoring and communications, it should be appreciated that that the dialogue monitoring and communications system 100 may also use these AI-based machine learning techniques in other various environments, such as in semantic searches, data management, fraud detection, competitive marketing, dynamic risk analysis, content-based recommendation engines, and other types of knowledge or data-driven management systems. The dialogue monitoring and communications system 100 may also use other various techniques, such as classification algorithms, clustering schemes, simulation models, decision trees, or use of knowledge graphs, to form a more comprehensive and flexible approach to dialogue monitoring and communications.

The advantages of the digital content management system may be readily apparent, but may include other benefits not described herein. According to examples described herein, an analytics-based support management platform may be provided predictive modeling and account management intelligence to enhance customer channel assignment and customer engagement/retention, especially for creating lead analytical records for progressing leads through a sales pipeline. For specific applications directed to managing implementation of product support solutions, the digital content management system may provide predictive analysis of likelihood of customer spend, when products or services can be expected to be purchased, and other commercial outcomes related to leads. Ultimately, the digital content management system described herein may therefore allow an organization entity (e.g., commercial, financial, government, etc.) to engage with users and provide a deeper level of product support that is more expedient, less error prone, and more intelligent approach to traditional techniques.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A digital content management system, comprising:
one or more data stores to store and manage data within a network;
one or more servers to facilitate operations using information from the one or more data stores;
an analytics system that communicates with the one or more servers and the one or more data stores to provide digital content management in the network, the analytics system comprising:
a data access interface to:
receive data associated with a customer, the data comprising at least one of client data, third party data, or dark data;
a processor to:
standardize the received data using a standardization technique;
process the standardized data using a data processing technique;
generate a customer fit score and a digital density score based on the data processing of the standardized data;
match the received data associated with a customer against at least one variable using at least one matching technique;
automatically create a lead analytical record based on the matching, wherein the lead analytical record comprises information associated with customer tendencies and customer network potential;
prioritize leads in the lead analytical record using a predictive modeling technique, wherein the predictive modeling comprises at least one of collaborative filtering, iterative propensity modeling, segmentation, and comparison-based response modeling; and
establish optimized channel assignment based on at least one of the customer fit score, the digital intensity score, the lead analytical record, or the matching and prioritization actions; and
an output interface to transmit, to a user device, at least one of the customer fit score, digital intensity score, lead analytical record, or optimized channel assignment via a dashboard or report.

2. The system of claim 1, wherein the client data is data that comprises limited attributes provided by a customer, the third party data is data available from a variety of third party vendors, and the dark data is data received from publicly available data sources.

3. The system of claim 1, wherein the standardization technique comprises cleaning and forming according to rules for characters, spaces, abbreviations, symbols, or cases.

4. The system of claim 1, wherein the data processing technique comprises:
   identifying a website; and
   using a web crawler to receive data associated to archetype, price points, pixels, and social badges.

5. The system of claim 1, wherein the customer fit score is generated based on the following:

$$\text{Customer Fit} = w1*\Sigma(\text{Sub-Archetype Score}) + w2*(\text{Price Point Score}) + w3*\Sigma(\text{Millennial Badge Score}) + w4*\Sigma(\text{Influencer Score}) + w5*\Sigma(\text{Engagement Score}) - w6*\Sigma(\text{Brick-And-Mortar Score}) + w7*\Sigma(\text{Semantic Score}),$$

where w1-w7 represent weights that are calculated as relative conversion rates based on a 5-point scale based historical data.

6. The system of claim 1, wherein the digital intensity score is generated based on the following:

$$\text{Digital Intensity Score} = w1*\Sigma(\text{Pixel Score}) + w2*\Sigma(\text{Social Badge Score}) + w3*\Sigma(\text{\# of Ad Tech}) + w4*\Sigma(\text{ECommerce Stack}) + w5*\Sigma(\text{Payment Type}),$$

where w1-w7 represent weights that are calculated as relative conversion rates based on a 5-point scale based historical data.

7. The system of claim 1, wherein the matching is based on data from different sources and interlinking.

8. The system of claim 1, wherein the variable comprises at least one of name, zip code, website, email, web domain, email domain, phone number.

9. The system of claim 1, wherein the matching comprises at least one of deterministic matching, probabilistic matching, and fuzzy matching.

10. A method for digital content management, comprising:
   receiving, at a processor, data associated with a customer, the data comprising at least one of client data, third party data, or dark data;
   standardizing the received data using a standardization technique;
   processing the standardized data using a data processing technique;
   generating a customer fit score and a digital density score based on the data processing of the standardized data;
   matching the data associated with a customer against at least one variable using at least one matching technique;
   automatically creating a lead analytical record based on the matching, wherein the lead analytical record comprises information associated with customer tendencies and customer network potential;
   prioritizing leads in the lead analytical record using a predictive modeling technique, wherein the predictive modeling comprises at least one of collaborative filtering, iterative propensity modeling, segmentation, and comparison-based response modeling;
   establishing optimized channel assignment based on at least one of the customer fit score, the digital intensity score, the lead analytical record, or the matching and prioritization actions; and
   transmitting, to a user device, at least one of the customer fit score, digital intensity score, lead analytical record, or optimized channel assignment via a dashboard or report.

11. The method of claim 10, wherein the client data is data that comprises limited attributes provided by a customer, the third party data is data available from a variety of third party vendors, and the dark data is data received from publicly available data sources.

12. The method of claim 10, wherein the standardization technique comprises cleaning and forming according to rules for characters, spaces, abbreviations, symbols, or cases.

13. The method of claim 10, wherein the data processing technique comprises:
   identifying a website; and
   using a web crawler to receive data associated to archetype, price points, pixels, and social badges.

14. The method of claim 10, wherein the customer fit score is generated based on the following:

$$\text{Customer Fit} = w1*\Sigma(\text{Sub-Archetype Score}) + w2*(\text{Price Point Score}) + w3*\Sigma(\text{Millennial Badge Score}) + w4*\Sigma(\text{Influencer Score}) + w5*\Sigma(\text{Engagement Score}) - w6*\Sigma(\text{Brick-And-Mortar Score}) + w7*\Sigma(\text{Semantic Score}),$$

where w1-w7 represent weights that are calculated as relative conversion rates based on a 5-point scale based historical data.

15. The method of claim 10, wherein the digital intensity score is generated based on the following:

$$\text{Digital Intensity Score} = w1*\Sigma(\text{Pixel Score}) + w2*\Sigma(\text{Social Badge Score}) + w3*\Sigma(\text{\# of Ad Tech}) + w4*\Sigma(\text{ECommerce Stack}) + w5*\Sigma(\text{Payment Type}),$$

where w1-w7 represent weights that are calculated as relative conversion rates based on a 5-point scale based historical data.

16. The method of claim 10, wherein the matching is based on data from different sources and interlinking.

17. The method of claim 10, wherein the matching comprises at least one of deterministic matching, probabilistic matching, and fuzzy matching.

18. A non-transitory computer-readable storage medium having an executable stored thereon, which when executed instructs a processor to perform the following actions:
   receive data associated with a customer, the data comprising at least one of client data, third party data, or dark data;
   standardize the received data using a standardization technique;
   process the standardized data using a data processing technique;
   generate a customer fit score and a digital density score based on the data processing of the standardized data;
   match the data associated with a customer against at least one variable using at least one matching technique;
   automatically create a lead analytical record based on the matching, wherein the lead analytical record comprises information associated with customer tendencies and customer network potential;
   prioritize leads in the lead analytical record using a predictive modeling technique, wherein the predictive modeling comprises at least one of collaborative filtering, iterative propensity modeling, segmentation, and comparison-based response modeling;
   establish optimized channel assignment based on at least one of the customer fit score, the digital intensity score, the lead analytical record, or the matching and prioritization actions; and transmit, to a user device, at least one of the customer fit score, digital intensity score, lead analytical record, or optimized channel assignment via a dashboard or report.

\* \* \* \* \*